US012630036B2

(12) United States Patent
Galbraith et al.

(10) Patent No.: US 12,630,036 B2
(45) Date of Patent: May 19, 2026

(54) SYSTEMS AND METHODS FOR OPTIMAL CONTROL OF ELECTRIC VEHICLE FLEET AND CHARGING INFRASTRUCTURE

(71) Applicant: BluWave Inc., Ottawa (CA)

(72) Inventors: Christopher Galbraith, Ottawa (CA); Keegan Michael John Green, Ottawa (CA); Kaan Turker Gun, Ottawa (CA); Thomas Triplet, Ottawa (CA); Alexander Linchieh, Ottawa (CA); Devashish Paul, Ottawa (CA)

(73) Assignee: BluWave Inc., Ottawa (CA)

( * ) Notice: Subject to any disclaimer, the term of this patent is extended or adjusted under 35 U.S.C. 154(b) by 0 days.

(21) Appl. No.: 18/612,663

(22) Filed: Mar. 21, 2024

(65) Prior Publication Data

US 2024/0343149 A1 Oct. 17, 2024

Related U.S. Application Data

(60) Provisional application No. 63/605,244, filed on Dec. 1, 2023, provisional application No. 63/495,418, filed on Apr. 11, 2023.

(51) Int. Cl.
*B60L 53/62* (2019.01)
*B60L 53/63* (2019.01)
(Continued)

(52) U.S. Cl.
CPC .............. *B60L 53/62* (2019.02); *B60L 53/63* (2019.02); *B60L 53/67* (2019.02); *B60L 53/68* (2019.02); *G05D 1/692* (2024.01); *B60L 2240/80* (2013.01)

(58) Field of Classification Search
None
See application file for complete search history.

(56) References Cited

U.S. PATENT DOCUMENTS

2013/0024035 A1* 1/2013 Ito .......................... B60L 53/51
700/291
2021/0086647 A1* 3/2021 Kiessling ................ B60L 53/67
(Continued)

OTHER PUBLICATIONS

H. Zhang, J. Huang and F. L. Lewis, "Algorithm and stability of ATC receding horizon control," 2009 IEEE Symposium on Adaptive Dynamic Programming and Reinforcement Learning, Nashville, TN, USA, 2009, pp. 28-35, doi: 10.1109/ADPRL.2009. 4927522. (Year: 2009).*

(Continued)

*Primary Examiner* — David V Henze-Gongola
(74) *Attorney, Agent, or Firm* — Borden Ladner Gervais LLP

(57) ABSTRACT

Systems and methods for providing control in relation to multiple EVs, for example an EV fleet, are provided. A system generates charging control information for EVs based on a receding horizon optimization. The optimization may be based on EV charging goal information related to the EVs including information relating to target charging completion time, and target EV battery state of charge (SoC) information at target charging completion times. The optimization may also be based on prediction information relating to EVs predicted to become available for charging during the optimization horizon. The charging control information may comprise indications of individual EVs to charge during a given time interval during the horizon. The system utilizes various available information as well as predicted data to provide more optimal control to EVs, thereby taking advantage of previously missed opportunities for enhanced optimization.

20 Claims, 19 Drawing Sheets

(51) Int. Cl.
    B60L 53/67         (2019.01)
    B60L 53/68         (2019.01)
    G05D 1/692       (2024.01)

(56)           References Cited

U.S. PATENT DOCUMENTS

| | | |
|---|---|---|
| 2022/0227252 A1 | 7/2022 | Sadeghianpourhamami et al. |
| 2022/0363140 A1 | 11/2022 | Dayal et al. |
| 2022/0410750 A1 | 12/2022 | Mangal et al. |
| 2022/0410755 A1* | 12/2022 | Pathipati .............. H02J 7/0047 |
| 2024/0227611 A1* | 7/2024 | Ju ........................... B60L 53/31 |

OTHER PUBLICATIONS

International Patent Application No. PCT/CA2024/050454, International Search Report and Written Opinion dated Jun. 25, 2024.
European Patent Application No. 24205815.4, Extended European Search Report dated Nov. 26, 2024.
Provoost et al., "Improving Operational Efficiency In EV Ridepooling Fleets by Predictive Exploitation of Idle Times", Arxiv.Org, Cornell University Library, 2022, pp. 1-21.
Yukun Yuan et al., "p/\2Charging: Proactive Partial Charging for Electric Taxi Systems", IEEE Th International Conference on Distributed Computing Systems Icdcs), IEEE, 2019, pp. 688-699.

* cited by examiner

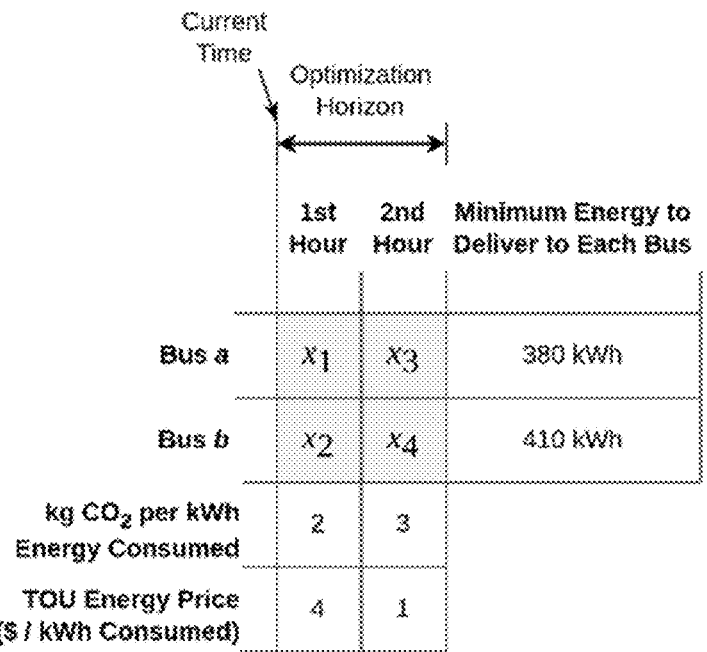
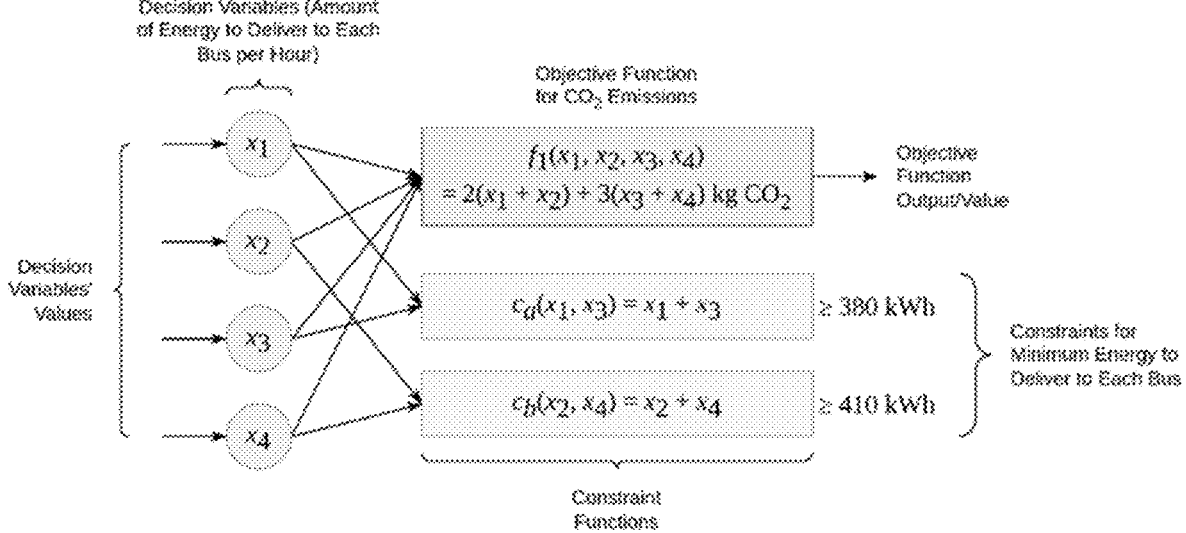
(a) Optimization problem with one objective
(minimizing $CO_2$ emissions) and two constraints:
FIG. 1C

(b) Optimization problem with two objectives, re-expressed as part of a larger objective using monetary terms, and two constraints:
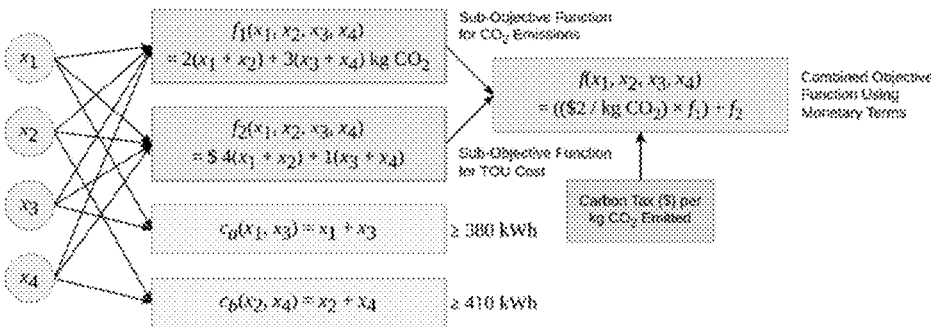
(c) Optimization problem with two objectives and two constraints, all re-expressed as part of a larger objective using subjective weightings:
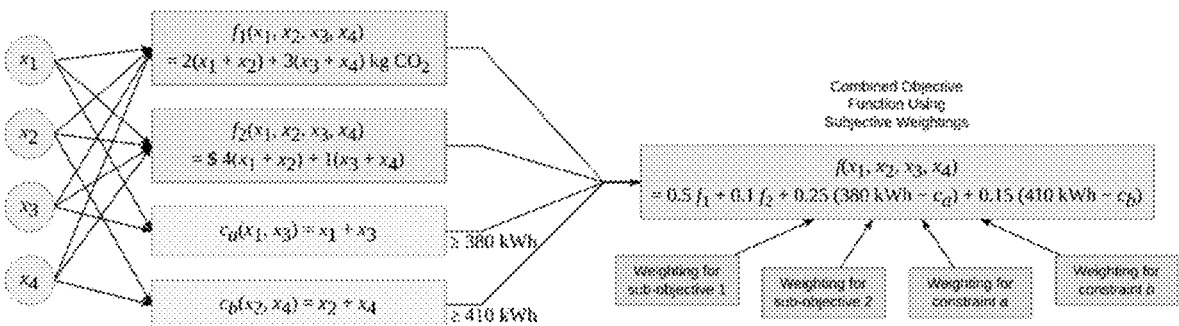
FIG. 1D

750

700

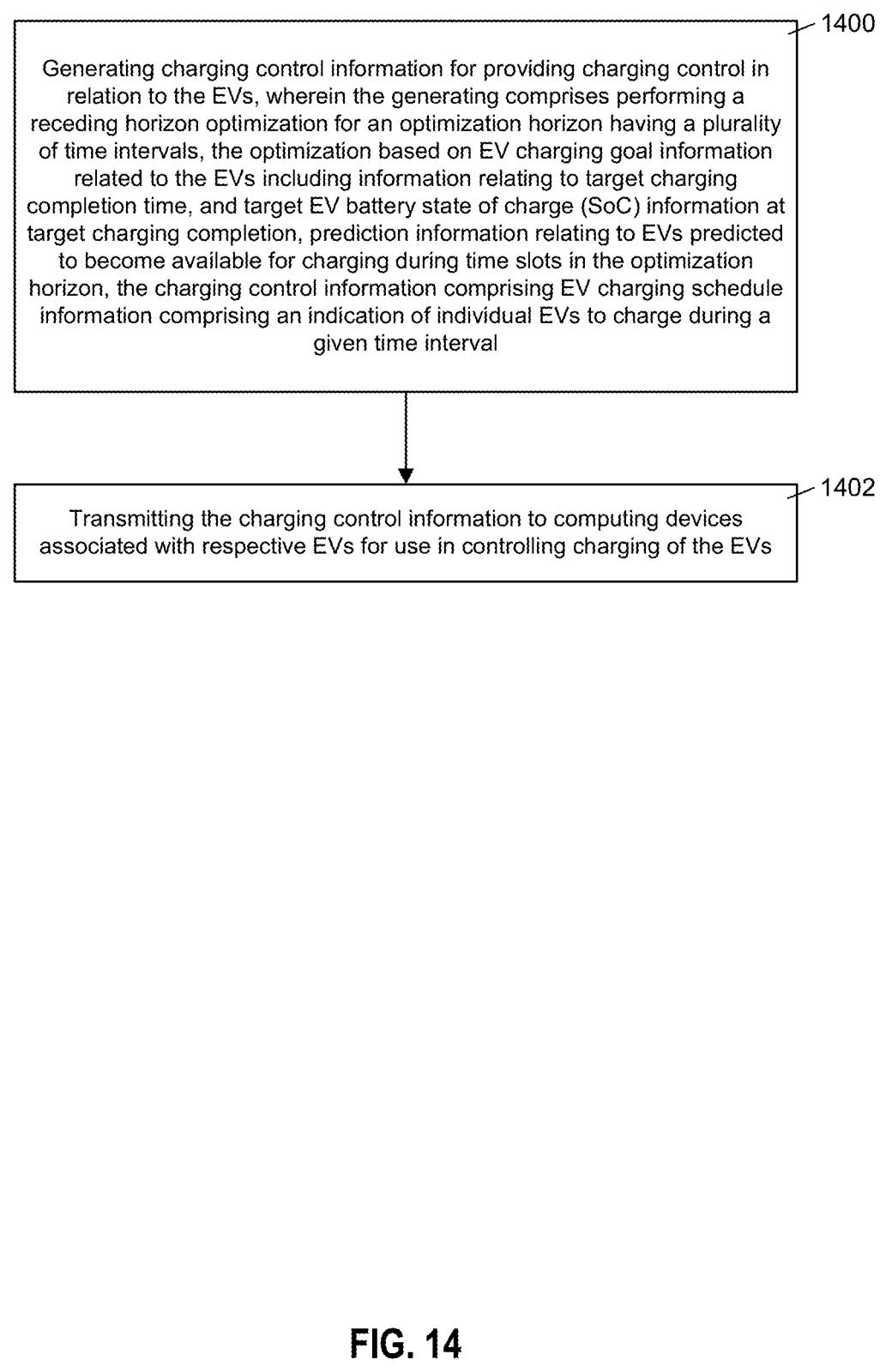

1400

Generating charging control information for providing charging control in relation to the EVs, wherein the generating comprises performing a receding horizon optimization for an optimization horizon having a plurality of time intervals, the optimization based on EV charging goal information related to the EVs including information relating to target charging completion time, and target EV battery state of charge (SoC) information at target charging completion, prediction information relating to EVs predicted to become available for charging during time slots in the optimization horizon, the charging control information comprising EV charging schedule information comprising an indication of individual EVs to charge during a given time interval

1402

Transmitting the charging control information to computing devices associated with respective EVs for use in controlling charging of the EVs

FIG. 14

SYSTEMS AND METHODS FOR OPTIMAL CONTROL OF ELECTRIC VEHICLE FLEET AND CHARGING INFRASTRUCTURE

CROSS REFERENCE TO RELATED APPLICATIONS

This application claims the benefit of, or priority to, U.S. Provisional Patent Application No. 63/495,418 filed on Apr. 11, 2023, and U.S. Provisional Patent Application No. 63/605,244 filed Dec. 1, 2023, which are incorporated herein by reference.

FIELD

The present disclosure relates generally to systems, apparatuses, and methods for providing control of electric vehicles (EVs), fleets of EVs, and EV charging infrastructure.

BACKGROUND

Vehicle fleets and their operators worldwide face increased demand and incentives to transition to EVs, reduce energy costs, and reduce greenhouse gas (GHG) emissions, all while being expected to continue providing reliable service. However, existing solutions are not necessarily conducive to achieving these objectives and constraints. Amid climate concerns, rising energy costs, and increased demand for EVs, improvements are desired.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF DESCRIPTION OF THE DRAWINGS

Example embodiments of the present disclosure will now be described with reference to the attached Figures.

FIGS. 1C and 1D illustrate an example optimization.

FIG. 14 is a process flow diagram of an example method.

Figure 1A:
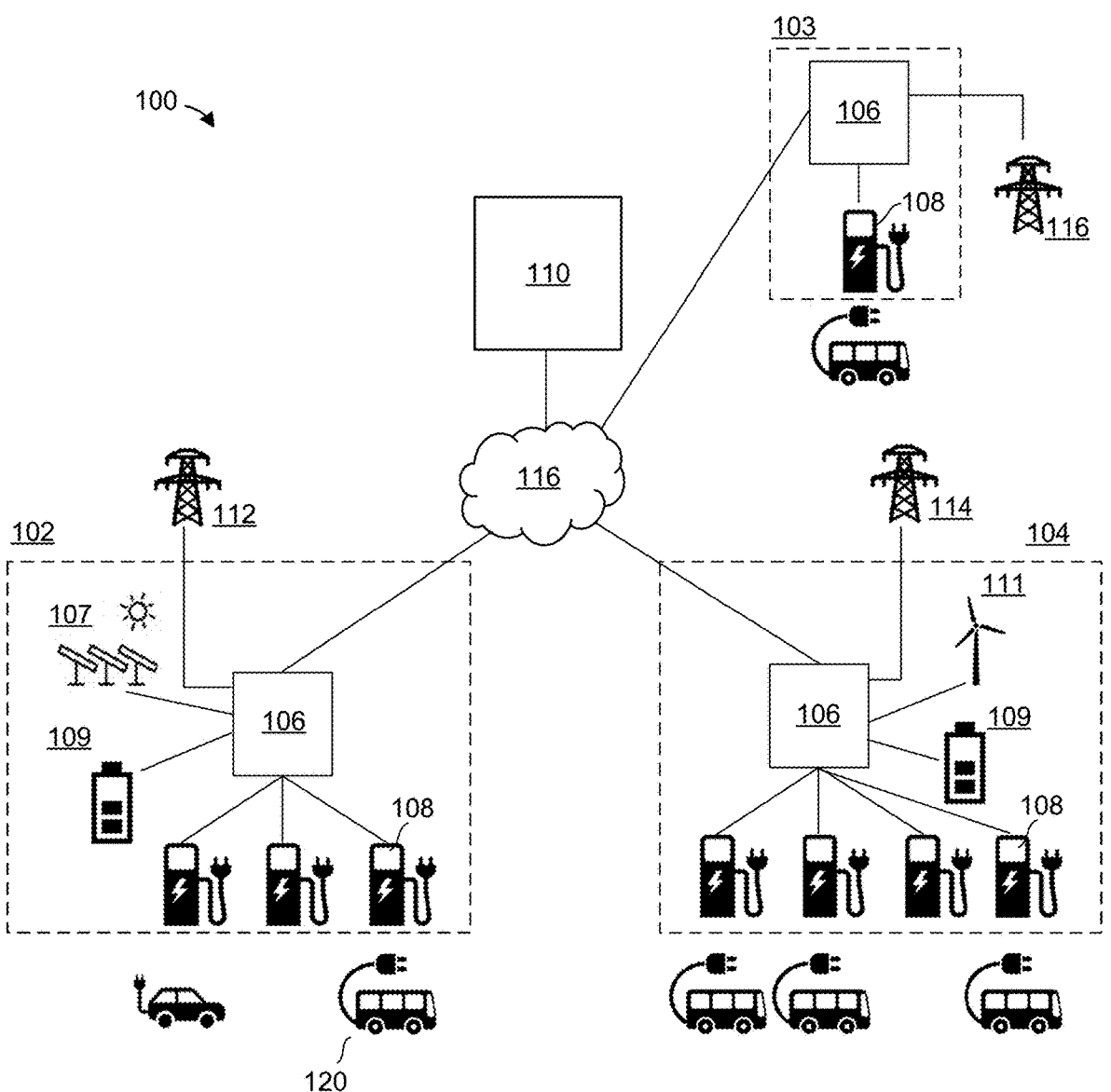
FIG. 1A is a block diagram of an example EV management system having EV charging infrastructure.

The relative sizes and relative positions of elements in the drawings are not necessarily drawn to scale. For example, the shapes of various elements and angles are not necessarily drawn to scale, and some of these elements may be arbitrarily enlarged and/or positioned to improve the readability of the drawings. Further, the particular shapes of the elements as drawn are not necessarily intended to convey any information regarding the actual shape of the particular elements, and have been solely selected for ease of recognition in the drawings.

DETAILED DESCRIPTION

This disclosure generally relates to improvements in EV charging infrastructure and management technologies, including systems, apparatuses, and methods for providing control in relation to EVs and fleets of EVs.

In an aspect, the present disclosure provides systems and methods adapted to perform optimizations with respect to one or more objectives relating to EVs or fleets of EVs. The system may then provide control in relation to the EVs or other controllable assets based on the results of the optimizations. Control may relate to controlling the charging of EV in an optimized manner. Prior approaches typically do not use a lot of data that is or could be available, resulting in missed opportunities for more optimized charging control. Data may relate to the EVs themselves or their environment. In addition, prior approaches typically do not generate predictions of information that can be used by an optimizer for controlling the EV charging, again resulting in missed opportunities for more optimized charging control. Predicted information may include predictions of when and how many EVs will become available to charge (for example when they arrive at and plug into a charging station), depart from charging (for example when an EV is expected to be, or actually is, no longer available for charging, for example due to a target or actual departure), or EV arrival battery SoC, target EV departure SoC (for example a target EV SoC at a target departure time, which may be specified by an EV user, by the optimization system, and so on), charger availability, charging power cost information, time of use energy pricing information, and so on. In an aspect, the present disclosure provides improvements where EV charging is controlled to optimize for an objective.

A system or method may generate charging control information for providing charging control in relation to EVs. The generating may comprise performing a receding horizon optimization for an optimization horizon so that the system optimizes for more than just a short term time window. The optimization may be based on any suitable information, for example target EV charging completion times (e.g. when users and/or the system wants their EVs sufficiently charged)

or target EV battery state of charge (SoC) information at the target charging completion times (e.g. user specified minimum charge level). In addition, the optimization may be based on prediction information, for example when EVs are available to start charging (e.g. meaning for example when an EV plugs into a charging station, for example when an EV arrives at a charging station and plugs in to a charging power source) during the horizon. When an EV becomes available for charging is sometimes generally referred to herein as when an EV "arrives" and such times are sometimes referred to as "arrival times". Similarly, when an EV becomes unavailable for charging is sometimes generally referred to herein as when an EV "departs" and such times are sometimes referred to as "departure times". The system may generate control signals to control charging of the EVs, for example charging scheduling information that may include an indication of individual EVs to charge during a given time interval in the horizon. The control information may be provided to one or more computing devices associated with respective EVs for use in controlling charging of the EVs.

Some example optimization objectives include but are not limited to minimizing greenhouse gas (GHG) emissions used to generate power for charging assets such as EVs, minimizing overall power used by the EVs (for example to accomplish the same or similar tasks, for example by EVs in a fleet), reducing the amount of power-generating sources that produce higher levels of greenhouse gases, maximizing the amount of power generated using clean and renewable sources, maximizing amount of locally generated renewable power used for charging, minimizing GHGs emitted by ICE vehicles co-operating with EVs in a mixed fleet, minimizing operating costs for example for a fleet of EVs or for another system, improving the grid stability and so on. Other example objectives include minimizing the cost of power used to charge the EVs, reducing an overall cost of charging or operating an EV fleet, maximizing a number of EVs that can use the charging infrastructure without having to expand or otherwise upgrade the charging infrastructure, maximizing a number of EVs having at least a minimum state of charge (SoC), minimizing the amount of time that charge points are not being used, maximizing charge point availability, minimizing driving time such as delivery or commute time, maximizing customer satisfaction, minimizing an overall peak energy use or grid draw (for example at one location such as a depot, a charging station, etc.), maximizing energy arbitrage (for example buying energy at a lower price, storing it, and selling it in the future at an increased price), minimizing wait times to customers for pickups of people or goods by EVs, maximizing lifespans of batteries (for example of EVs and/or ESSs), minimizing degradation of batteries, minimizing cost of power for charging in a time-of-use power pricing scheme, maximizing the utilization of EVs (for example service kilometers driven), planning an recommended vehicle to charger assignment as well as power setpoints to minimize vehicle idle times and maximise throughput and so on. In addition, other objectives are possible and contemplated. At least some of these objectives may be achieved by providing control in relation to one or more aspects of one or more of the EVs (for example assignment of various EVs to various routes, selection of routes to destinations, selection of times for driving, selection of charge points or charging stations to be used by EVs, selection of the power level at which to charge EVs, etc.), other controllable assets, charging infrastructure, times during which EVs charge, power sources used to charge EVs, and so on.

In some previous approaches, EV control systems, for example a system associated with an EV depot, do not optimize for any objectives, or at least not relating to controlling EV charging or operation.

Not optimizing for any objective may take the form of one or more of the following. In an example, this may involve charging EVs immediately upon arrival and on a first-come-first-serve basis. In addition, this could involve applying guard bands to EVs regarding their charging or operation thereby foregoing opportunities for optimizations. In an example, this may involve only discharging an energy storage system (ESS), such as a battery backup, when there is a power outage, or perhaps to avoid causing an untimely peak in consumption from the power grid and the resulting high costs. In an example, this may involve using a predefined set of routes that are not changed unless they need to be changed on-the-fly, such as due to adverse weather. In an example, this may involve using the same EV for the same route unless it breaks down. In an example, this may involve having as many identical EV charge points as EVs and using the same charge point for the same EV unless the charge point is broken.

These examples are generally not optimal, require exceptional cases (for example adverse weather) to be handled manually, and are not particularly supportive of mixed fleets or mixed types of charge points, which may make ad-hoc swapping of EVs with routes and charge points for manually handling exceptional cases more difficult.

Receding-horizon optimization is a general control scheme that involves repeatedly solving an optimization problem over a moving time horizon, often with predictions. However, receding-horizon optimization for EV charging control management and EV operation management may have been avoided in previous approaches, for example because some that may be desired or required was not available or could not be readily predicted, or because predicting such information was not integrated with an EV management system These problems may be exacerbated if such data had to be manually provided to an EV management system as mentioned above.

The terms "prediction" and "predictor" are generally used herein to include forecasts and forecasters. Although, in some instances, the terms forecast and forecaster may be used, for example "weather forecast" and so on.

In previous approaches, an EV fleet, or a subset thereof, may be managed by an EV depot to which it is assigned, rather than simultaneously managing the fleet across multiple depots under one optimization scheme. Such optimization is more difficult and requires coordination across depots, but may facilitate better optimization results. As an example, consider two nearby depots, each with as many charge points as assigned EVs, however the first depot has a broken charge point and the second depot has a broken-down EV. Optimizing which EVs should plug into which charge point at each depot separately fails to consider reassigning the EV of the first depot to the second depot, as may be more optimal.

In addition, in previous approaches, EV depots may not have intelligently coordinated backup plans for events such as broken-down equipment (as in the above example), power outages, internet outages, etc. For example, a response of a depot to a power outage may be to fully discharge an on-site ESS to charge EVs even if not necessarily required because power may be restored. Such improvements to previous approaches would be more robust/resilient.

There is presently no solution that, in multi-objective optimization in an application to EV control management, allows the objectives to be combined under an overall objective (such as an objective for overall cost), or that allows operators to choose which of the objectives should be favored by the optimization and by how much.

The present disclosure relates to improvements in EV charging infrastructure and computer-based EV management technologies, including for providing control in relation to EVs or fleets of EVs, and to related energy management technologies. For simplicity, the providing of control and management in relation to EV charging infrastructure and the providing of control and management in relation to EV fleets may generally be referred to as controlling EVs or controlling an EV fleet. Furthermore, controlling an EV fleet may additionally include controlling non-EV vehicles as well as other controllable assets in the system. In general, a controllable asset in a system refers to any asset that is controllable, for example EVs, other vehicles, charging infrastructure, ESSs, rooftop solar generator, other energy generation assets and other components.

In an aspect, the present disclosure provides systems and methods enabling coordinated control and optimization for managing an EV fleet, including for controlling energy supply to and consumption by an EV fleet.

In at least some embodiments, an EV management system according to the present disclosure provides control to EVs or EV charging infrastructure, wherein the controlling may include performing optimizations upon which the control is based. The EV management system may include an optimizer and, optionally, one or more predictors. In the case of having predictor(s), some or all of their predicted outputs may be fed into the optimizer among its inputs. In some embodiments, an optimizer itself may be configured to perform predictions or to effectively perform predictions. An optimization is performed in relation to one or more objectives, and the optimization may determine optimal or efficient actions for the EVs or the EV charging infrastructure. The EV management system may perform multi-objective optimization, in which case it may enable operator(s) to choose which of the objectives should be favored by the optimization and by how much.

Teachings according to the present disclosure may be applied and implemented in various different fields and applications. For example, the present disclosure may be applied to transit applications, for instance fleets that transport people such as busses, vans, aircraft, trains, ships, and so on. Another example is delivery applications, for example last-mile delivery which generally involves a last leg of a journey involving transit of passengers or goods from a hub to final destinations. Another example is a depot or other site of operation with other suitable electrical assets. For instance, this could include a storage yard or depot for battery-powered heated or refrigerated truck trailers that may require charging at the yard before their subsequent departure. Another example is private fleets, which have EVs or other electrical assets that typically operate in a contained area such as a private location. An example of a private fleet includes electrified airport vehicles or aircraft support vehicles (e.g. for refueling, luggage handling, aircraft towing, passenger transit within the airport area, and so on). These foregoing examples are not comprehensive. The present disclosure may be applied in many other fields and applications.

A controller in the system, which may include an optimizer, may take and use as input information relating to a state of the control environment to generate control information for providing control in relation to the EVs. This information may generally be referred to as control environment information, which may be information that is generally associated with a control environment of the system, and may at least partly represent a state of the environment.

Examples of types information that may be used by the system, for example by an optimizer or predictor, and which may form part of control environment information, include but are not limited to EV charging demand; charge point usage demand; SoCs of batteries of EVs; SoCs of batteries of ESSs; state of health (SoH) information of batteries; energy capacities of EVs and/or ESSs; information relating to EVs such as EV type or other EV specifications for example EV dimensions, battery capacity, compatibility with charging infrastructure, vehicle capacity in terms of load or number of passengers, energy use information; EV locations; EV telemetry data; times when EVs are available to charge; preferred or scheduled EV departure times; EV arrival times; specifications relating to charge points, charging stations, or charging infrastructure generally, such as type, load capacity, supported charging rates; availability of charge points; charge point locations; charge point charging rates; cost of power/energy such as for charging, such as that from an on-site generator or grid, such as time-of-use (TOU) pricing; availability of power from a grid, renewable sources, and/or on-site power generation including renewable such as wind or solar; other factors that affect the power available to plugged-in EVs (such as other on-site electric loads); on-site power generation amount or capacity or type; depot on-site power generation information; depot on-site energy storage capacity; power consumers' demand in a power grid or other power system; overall load at a vehicle depot; EV charging load at a depot; load or demand of a power system such as a power grid; weather information (may include ambient temperature, precipitation, humidity, visibility, wind, and so on); indoor or outdoor temperature, factors affecting energy use of EVs (for example traffic, weather, or customer demand); charge point or ESS power; EV charging infrastructure information; charge point types or specifications; charge point status or health; charge point maximum charging rates; charging infrastructure topology; charge point or charging station maximum power or load capacity; financial information; energy market data; environmental data; contextual data; EV routes; EV routing information; bus routes; mapping information or topology maps or information; traffic information such as volume of vehicles, delays, accidents, roadwork, detours, and so on (which may affect driving behaviour such as speed, routes taken, total driving time to a destination, and so on); initial estimates of decision variables an optimization problem; coincident peaks; photovoltaic (PV) or solar information. Control environment information may include or be in the form of any of historical information, current information, and/or predicted information. For example, EV SoC information may be historical, current, estimated, and/or predicted information. Furthermore, at least some of the information used by the system may be considered input to the system.

In addition, the system may comprise one or more predictors that generate prediction information of any suitable types, including but not limited to the examples provided above and elsewhere herein. Furthermore, in some embodiments, an optimizer may effectively generate prediction information.

An optimizer may have a pre-determined model of the control environment and/or the optimizer may learn about the environment from historical data. A model may include or be based on, for example, information about vehicles, chargers and underlying behavioural patterns.

Future SoCs, such as those of EVs upon arrival, and drops in SoC due to fulfilling upcoming routes/service for which the EV must be correspondingly charged, may be predicted, for example by an EV management system. Providing control in relation to EVs may include generating control information for controlling the charging EVs, and/or control information for controlling the operation of EVs. The control information may be provided to EVs or other assets to be controlled, or the control information may be provided to a computing device that is associated with the EVs for providing the control.

A SoC of a battery, or of a battery cell, generally refers to an energy level that is currently available from the battery as a function or percentage of the maximum capacity of the battery. Thus, the SoC value typically varies between 0% and 100%. A battery is said to be fully charged when the SoC is at 100%, and a battery is said to be completely discharged when the SoC is 0%. An absolute (meaning not a ratio) amount of remaining energy in a battery may be calculated by multiplying the SoC value against the maximum capacity of the battery. In addition, SoC information may include or refer to any parameter or value representing to, or indicating, an energy level of a battery. For example, SoC information may comprise or consist of the energy level of a battery, which may be represented in a unit of energy (e.g. kWh), and so on.

The generated control information may include charging control information and/or EV operation control information. Charging control information may provide for control in relation to EV charging, which may include controlling an EV and/or EV charging infrastructure. This may include when the EV charges, how it charges, the charging rate used, the source(s) of power that is used for charging, whether renewable power is used, and so on. Operation control information may generally relate to the operation of EVs, including specific routes to take to destinations, driving speeds, dates/times to start driving routes, geographic regions in which to position EVs, and so on.

The controlling of EVs or an EV fleet may generally include providing information to EVs, charging infrastructure such as charge points, other computing devices such as EV onboard hardware or computing devices, or other computing devices used by drivers or other users associated with EVs for example smart phones or tablets or smart watches, and so on. The provided information relating to control may include any suitable types of information that may be used to control or influence actions taken by EVs or charging infrastructure, or by drivers or other users associated with EVs. For example, control information may include actions, instructions, suggestions, recommendations, options, and so on. For example, control information may include an instruction or recommendation for an EV to take a specific route to a destination, or to use a specific charge point for the next charging session, or to charge at a specific date/time, and so on. In some cases, depending on the configuration, control information may be provided to a computing device onboard an EV or at charging infrastructure, which may cause the EV or charging infrastructure to take one or more specific actions. These actions may be performed at least in some situations without any human intervention or involvement. In other situations, some user input may be prompted or received, which may initiate, stop or otherwise influence the action taken.

In other cases, depending on the configuration, control information may be provided to a computing device to be outputted to a user, for example on a computer display, or audibly via a speaker, and so on. Other information may be exchanged with a user via similar means. A user may then take one or more actions in response to the outputted control information in relation to the operation and/or charging of an EV. An example of an action taken by a user include providing input to the same computing device or to a different computing device, where the input may initiate some action by an EV or charging infrastructure. An example of another action taken by a user may be to operate an EV in a manner indicated by the outputted control information, for example to drive the EV on a specific route, to charge the EV at a specific charge point and/or at a specific time/date, and so on. The control information may comprise instructions to be followed, suggestions to be considered, and/or options or other parameters that may be selected, toggled, adjusted, inputted, and so on. An example of a suggestion may be to indicate the availability of a nearby charge point, or a suggested route to a destination. An example of an option may be a listing of multiple nearby available charge points, or multiple routes to a destination. In some cases, control information may comprise any combination of various types of control information according to the present disclosure.

Control information may include charging control information and operation control information. Charging control information may generally relate to providing control or management in relation to the charging of EVs, which may include actions for the EV and/or for EV infrastructure, for example a specific charge point to use, a specific date/time to charge, a charging rate to use, and so on. Operation control information may generally relate to operation of EVs, including a specific route to take to a destination, a speed to drive at, a date/time to start driving a route, a geographic region in which to position an EV (e.g. a taxi covering a particular neighborhood, etc.), and so on. Operation control information may include information for controlling or managing the usage of energy by the EV during operation, for example to make the most efficient use of energy stored in the EV or to ensure the EV is physically located to be able to charge at appropriate times (for example not during a journey, for instance in the case of a taxi, bus, and so on where it may be undesirable to have the EV stop for charging), and so on.

The providing of control information, which may include actions, instructions, recommendations, options, etc. may be referred to herein simply as providing control information for ease of description. In addition, actions, instructions, recommendations, options, and so on may be referred to herein simply as actions for ease of description.

Example actions include charging rates/setpoints, charge profiles (which may include charging rates, start/stop times, etc.), times or schedules for charging EVs, the source(s) of energy to be used for EV charging, battery charging rates for EVs, routes to be driven by EVs, which EVs are assigned to which routes, which EVs are assigned to which territories and when, which EVs are assigned to which charge points, or times or schedules for charging and discharging energy from one or more ESSs. A charging schedule may include dates, times and time intervals during which charging is to occur. Such systems may provide improvements to EV and EV charging infrastructure and management technologies, for example by minimizing or otherwise reducing the amount of electrical power consumed by EVs, for example in an EV fleet, to accomplish the same tasks, for example with optimal assignment of particular EVs to particular routes, optimal assignment of efficient routes, optimal use of renewable power to charge EVs, optimal assignment and scheduling of particular EVs to particular EV charge points, or optimal selection of charging rates for charging various EVs, and so on. Furthermore, other improvements to EV and EV charging infrastructure and management technologies may include enabling the increased use of renewable power sources for EV charging, reducing the chances that on-peak power from a power grid is used or reducing the amount of on-peak power grid power that is used, or reducing an overall amount of greenhouse gas emissions that are produced to generate the energy used for EV charging.

The flexibility of systems and methods according to the present disclosure for optimal control of EV fleets may allow the optimization of multiple objectives to be performed together such that an enhanced optimized result may be achieved. The optimized result may be achieved without manual management. Furthermore, the systems may be used with mixed fleets of vehicles, including fleets that use EVs in conjunction with vehicles powered by internal combustion engines or other modes of propulsion, and with mixed types of charge points. In addition, the integrated and automated nature of a system may facilitate the collection, preprocessing, and input of information to any forecasting systems, and the subsequent optimization(s) run by the system, as well as carrying out of the resulting optimal actions determined by the optimization(s). In an embodiment, the system supports receding-horizon optimization. Furthermore, in an embodiment, the coordinated nature of the system allows an entire fleet across multiple vehicle depots to be optimized such that one or more collective objectives, such as minimized greenhouse gas production among the depots, or minimized operating cost of all the depots, may be achieved. This is of particular value when the activities carried out by the depots are shared among them, e.g., a bus route can be served by electric bus depots A and/or B. Furthermore, fleet operators at separate depots may have different objectives (sub-objectives of an overall objective among the depots), e.g., depot A operator may wish to minimize GHG emissions while depot B operator may wish to minimize operating costs. The fact that the depot's activities are controlled (whether directly or indirectly) as part of one optimization makes it coordinated. Optimization of a depot does not neglect another's activities or objective(s). In at least some embodiments, an optimization objective may be dynamically updated and customized to address a specific need of a fleet operator(s). In the case of multi-objective optimization, the system may allow operator(s) to dynamically choose which objective the optimization should favor and by how much, lending to the coordinated nature of the system among operators and/or depots. Additionally, in an embodiment, a system includes features to handle internal or external failures, such as a loss of communications or power to some or all components of the system.

According to an aspect, the present disclosure is directed to a system comprising a computer-readable storage medium having executable instructions; and one or more computer processors configured to execute the instructions to provide control in relation to charging of a plurality of electric vehicles (EVs), the instructions to: generate charging control information for providing charging control in relation to the EVs, wherein the generating comprises performing a receding horizon optimization for an optimization horizon having a plurality of time intervals, the optimization based on EV charging goal information related to the EVs including information relating to target charging completion time, and target EV battery state of charge (SoC) information at target charging completion, and prediction information relating to EVs predicted to become available for charging during time slots in the optimization horizon, the charging control information comprising EV charging schedule information comprising an indication of individual EVs to charge during a given time interval; and transmit the charging control information to computing devices associated with respective EVs for use in controlling charging of the EVs.

In an embodiment, the EV charging schedule information further comprises information relating to respective charging rates to be used with each of the individual EVs.

In an embodiment, the EV charging goal information comprises information relating to EVs that are currently charging.

In an embodiment, the EV charging goal information comprises prediction information relating to target charging completion time and to target EV battery state of charge (SoC) information at target charging completion.

In an embodiment, the EV charging goal information comprises prediction information relating to EVs predicted to become available for charging during time slots in the optimization horizon.

In an embodiment, the prediction information relating to EVs predicted to become available for charging comprises at least one of: a number of EVs predicted to become available for charging during at least one of the time slots, predicted SoC information of EVs predicted to become available for charging, and predicted target charging complete time information of EVs predicted to become available for charging.

In an embodiment, the instructions further to generate operation control information for controlling operation of EVs, wherein the generating comprises performing a receding horizon optimization for an operation optimization horizon having a plurality of time intervals, the optimization based on control environment information comprising EV battery state of charge (SoC) information relating to the EVs; and transmit the operation control information to computing devices associated with respective EVs for use in controlling the operation of the EVs.

In an embodiment, the operation control information comprises at least one of assignments of EVs to routes, and assignments of EVs to specific EVSEs for charging.

According to an aspect, the present disclosure is directed to a method comprising: at one or more electronic devices each having one or more processors and computer-readable memory to provide control in relation to charging of a plurality of electric vehicles (EVs): generating charging control information for providing charging control in relation to the EVs, wherein the generating comprises performing a receding horizon optimization for an optimization horizon having a plurality of time intervals, the optimization based on: EV charging goal information related to the EVs including information relating to target charging completion time, and target EV battery state of charge (SoC) information at target charging completion, and prediction information relating to EVs predicted to become available for charging during time slots in the optimization horizon, the charging control information comprising EV charging schedule information comprising an indication of individual EVs to charge during a given time interval; and transmitting the charging control information to computing devices associated with respective EVs for use in controlling charging of the EVs.

In an embodiment, the EV charging schedule information further comprises information relating to respective charging rates to be used with each of the individual EVs.

In an embodiment, the EV charging goal information comprises information relating to EVs that are currently charging.

In an embodiment, the EV charging goal information comprises prediction information relating to target charging completion time and to target EV battery state of charge (SoC) information at target charging completion.

In an embodiment, the EV charging goal information comprises prediction information relating to EVs predicted to become available for charging during time slots in the optimization horizon.

In an embodiment, the prediction information relating to EVs predicted to become available for charging comprises at least one of: a number of EVs predicted to become available for charging during at least one of the time slots, predicted SoC information of EVs predicted to become available for charging, and predicted target charging complete time information of EVs predicted to become available for charging.

In an embodiment, the method further comprises: generating operation control information for controlling operation of EVs, wherein the generating comprises performing a receding horizon optimization for an operation optimization horizon having a plurality of time intervals, the optimization based on control environment information comprising EV battery state of charge (SoC) information relating to the EVs; and transmitting the operation control information to computing devices associated with respective EVs for use in controlling the operation of the EVs.

In an embodiment, the operation control information comprises at least one of assignments of EVs to routes, and assignments of EVs to specific EVSEs for charging.

According to an aspect, the present disclosure is directed to a non-transitory computer-readable medium having computer-readable instructions stored thereon, the computer-readable instructions executable by at least one processor to cause the performance of operations relating to providing control in relation to charging of a plurality of electric vehicles (EVs), the operations comprising: generating charging control information for providing charging control in relation to the EVs, wherein the generating comprises performing a receding horizon optimization for an optimization horizon having a plurality of time intervals, the optimization based on: EV charging goal information related to the EVs including information relating to target charging completion time, and target EV battery state of charge (SoC) information at target charging completion, and prediction information relating to EVs predicted to become available for charging during time slots in the optimization horizon, the charging control information comprising EV charging schedule information comprising an indication of individual EVs to charge during a given time interval; and transmitting the charging control information to computing devices associated with respective EVs for use in controlling charging of the EVs.

In an embodiment, the EV charging goal information comprises prediction information relating to target charging completion time and to target EV battery state of charge (SoC) information at target charging completion.

In an embodiment, the prediction information relating to EVs predicted to become available for charging comprises at least one of: a number of EVs predicted to become available for charging during at least one of the time slots, predicted SoC information of EVs predicted to become available for charging, and predicted target charging complete time information of EVs predicted to become available for charging.

In an embodiment, the operations further comprising: generating operation control information for controlling operation of EVs, wherein the generating comprises performing a receding horizon optimization for an operation optimization horizon having a plurality of time intervals, the optimization based on control environment information comprising EV battery state of charge (SoC) information relating to the EVs; and transmitting the operation control information to computing devices associated with respective EVs for use in controlling the operation of the EVs.

In an embodiment, the optimization may be based at least on one or more of an optimization goal (e.g. an objective), information relating to timing of EV availability for charging and/or discharging, information relating to energy requirements for EV service activities (for example the amount of energy required by a bus to complete its scheduled route), and information relating to a state of the EVs for example EV SoC information.

In an embodiment, the optimization may be based at least on one or more of EV energy use goal information related to operation of the fleet in a profitable or sustainable manner, EV operational constraint information including information relating to service activities, information relating to preferred time of EV availability for service, and preferred EV battery state of charge (SoC) information at preferred time of charging completion, and prediction information relating to EVs expected to become available for charging or discharging during the optimization horizon including information relating to arrival times and EV SoC.

In an embodiment, the charging control information comprises EV charging schedule information comprising an indication of individual EVs to discharge, for example during a given time interval. Energy discharged from an EV may be used in any suitable manner, for example to charge an ESS (e.g. to be used later for other charging, or otherwise), to provide to a power grid or other power system, to charge another EV(s), and so on.

In an embodiment, the optimization may be based at least on prediction information relating to EVs predicted to arrive during the optimization horizon including information relating to predicted arrival times.

In an embodiment, the optimization comprises at least two optimization objectives that are conflicting, and wherein each of the conflicting objectives is assigned a respective weighting in the optimization.

In an embodiment, a plurality of EVs to be charged according to generated charging control information are associated with a vehicle depot and wherein the charging control information comprises control information in relation to charging the EVs at a plurality of charge points at the vehicle depot.

In an embodiment, the receding horizon optimization produces charging control information associated with each of the time intervals in the optimization horizon, and wherein the charging control information transmitted to the computing devices for use in controlling charging of the EVs comprises charging control information associated with a first time interval in the optimization horizon.

In an embodiment, the prediction information relating to EVs predicted to become available for charging comprises at least one of: a number of EVs predicted to become available for charging during at least one of the time slots or during each of the time slots of the time horizon, predicted SoC information of EVs predicted to become available for charging, and predicted target charging complete time information of EVs predicted to become available for charging.

In an embodiment, the operation control information comprises at least one of assignment of EVs to service activities (for example transporting goods or people, delivering goods, picking up items, and so on) or territories (for example defined geographic region(s)), modification of service activities or territories, assignment of EVs to specific charge points or other EVSE for charging, or sites where charge points or EVSE are located, assignment of constraints to EV operators (e.g. speed limits, efficiency targets, auxiliary system/HVAC operation), and removal of specific EVs from active service or termination of specific service activities.

FIG. 1A is a block diagram of an example EV management system 100 having EV charging infrastructure. System 100 comprises one or more vehicle depots 102, 103, 104, each having or associated with a computer based depot controller 106 (sometimes referred to as local hardware), and one or more EV charge points 108. Depots 102, 103, 104 may host or otherwise be incorporated in operations of a fleet of one or more vehicles, some or all of which are EVs 120. A depot controller 106 may include computer hardware, such as one or more servers or other computing devices, as well as software running on the computer hardware. In addition, the term depot controller is generally used to included other computing devices at a depot that are part of, or related to, the EV management system 100 and which provide some functionality at least relating to control or management of assets associated with the depot.

A depot 102, 103, 104 may optionally have or be connected to one or more local renewable energy generation sources, for example solar panels 107, wind turbines 111, and so on. Also, a depot 102, 103, 104 may optionally have or be connected to one or more energy storage systems (ESS) 109, such as a battery ESS (BESS). Further, a depot 102, 103, 104 may be electrically connected to one or more power grids 112, 114, 116 for receiving energy for charging EVs, powering any other devices, or optionally for providing energy to the power grid. Power grids 112, 114, 116 may be the same or different power grids.

Figure 1B:
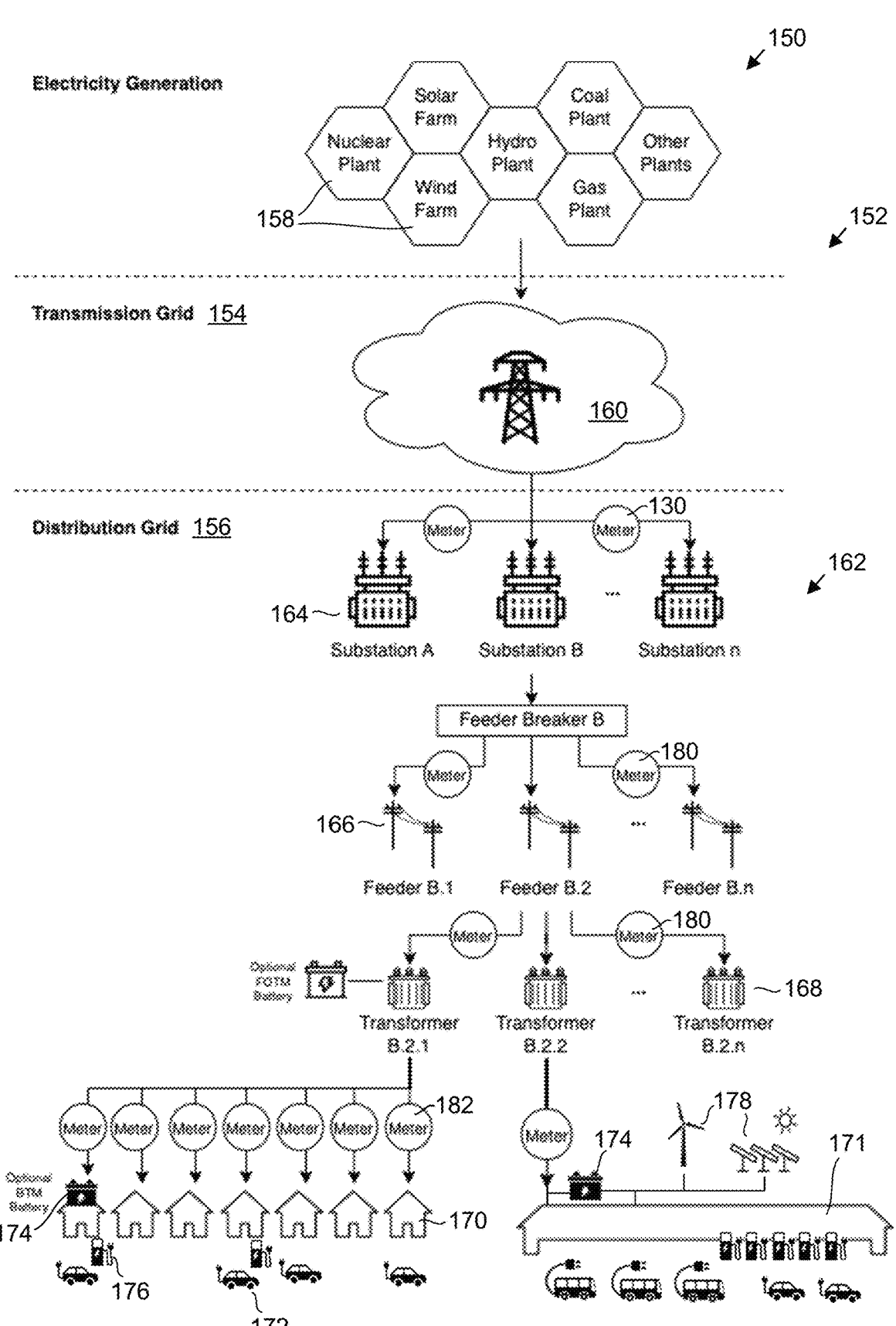
FIG. 1B is an example power system.

FIG. 1B shows an example power system 150 from which EVs 172 may receive charging power. A power system generally refers to any system that involves the transmission and/or distribution of power, including electrical power. A power system may include a power grid 152, which is generally a network for transmission and distribution from power producers to end customers. In addition, a power system may refer to only part of a power grid. However, in general, the terms power system and power grid are used interchangeably herein. Furthermore, a power grid generally refers to any power network or system, and is thus not limited to a conventional power grid. A power grid may be subdivided into several sub grids, for example a power transmission grid 154 and a power distribution grid 156. A power grid generally comprises one or more power generating plants 158, power transmission infrastructure 160 to carry power long distances, and power distribution infrastructure 162 to deliver power to end customers. Power generating plants 158 may include any types of power generation, such as fossil fuel such as coal or gas, nuclear, and renewables such as solar, wind, and so on.

Power distribution infrastructure 162 may include one or more substations 164, for example for stepping down the voltage from the transmission infrastructure to a lower voltage for the distribution infrastructure. Power distribution infrastructure 162 may include one or more feeders 166, which are electrical conductors, for example for delivering power from substations 164 to locations further downstream in the distribution infrastructure 162, such as distribution transformers 168. Distribution transformers 168 may further step down the voltage from the feeder lines 166 to a lower voltage, for example for delivery to end customers 170. EVs 172 may be associated with the customers 170 and potentially a vehicle depot 171. Customers 170 may be associated with any type(s) of power customer, for example a home or other building or dwelling, a vehicle depot 171, a charging station or a charge point 176, an EV, an ESS such as a battery energy storage system (BESS) 174, and so on. Customers 170 may have or be connected to one or more local power generation sources 178, which may include renewable generators such as solar or wind, and so on. A tree like structure of the distribution grid 156 may be thought of as having multiple different branches, for example from a substation to various feeders, or from a feeder to various transformers, and so on.

Power system 150 may have electrical meters, for example distribution meters 180 and/or customer meters 182, at various locations in the system 150. Meters may be used to measure any types of electrical parameters, such as current, voltage, power, and so on.

In addition, referring again to FIG. 1A, for controlling or managing system 100, system 100 comprises an EV management controller 110 in communication with each depot 102, 103, 104. Controller 110 may generally provide control to the EV management system 100, including to some or all specific components such as depots 102, 103, 104, EV charge points 108, ESS 109, or EVs 120. Control may include providing actions to the controllable assets (e.g. EVs, ESSs) or other components. Example actions include schedules for charging EVs, battery charging rates for EVs, routes to be driven by specific EVs, assignment of specific EVs to specific routes, assignment of EVs to specific charge points, and so on. Controller 110 may include computer hardware, such as a server(s) or other computing devices, as well as software running on the computer hardware. Some or all of the computing and/or computing resources of controller 110 may be cloud based. In such a case, controller 110 may be referred to sometimes as cloud computing hardware. EV management controller 110 and depots 102, 103, 104 may be communicatively coupled in any suitable way(s), including via communication network(s) 116. In an embodiment, EV management controller 110 may be partly or fully incorporated into a depot.

The depots 102, 103, 104, ESSs 109, charge points 108, and in particular the EVs 120 may be under the partial or full coordinated control of system 100 for some or all of the time. This may depend on, for example, how often the EVs are in communication with system 100 to exchange information and to receive instructions. This may also depend on whether and to what extent any of the components of system 100 are shared with an operator or entity that is outside of system 100. In addition, a plugged-in EV 120 may have some or full control of its power flow with a charge point 108, rather than, for example, the charge point 108 being in full control.

In relation to FIG. 1A, when there are multiple depots, activities of the depots may be optimized together if the activities carried out by the depots are shared among them, and if the depots differ in some way, since doing so may generally result in a more optimal outcome overall. For example, if there is a bus route that can be served by electric bus depots 104 and/or 103, and the amount of energy that must be delivered accordingly to buses at depots 104 and/or 103 depends on the distance traveled to fulfill that route, then the decision of which depot's buses to assign to the route and when may affect the amount of energy consumed by the depots and when, thus affecting objectives such as GHG emissions or cost. The decisions may be made as part of one, unified optimization problem. For example, assigning a bus associated with depot to fulfill the route at a certain time after depot 104's on-site renewable generation 111 is expected to peak, thereby utilizing renewable energy to charge the depot 104 bus and fulfill the bus service. In relation to FIG. 1A, especially when there are multiple depots, there may be multiple depot operators with differing preferences in the form of objectives that are in conflict between the depots. For example, depot 104 operator may wish to minimize GHG emissions among both depots while depot 103 operator may wish to minimize operating costs among both depots.

Continuing the above example regarding deciding which depot should fulfill the bus route, these objectives may be conflicting if, for instance, a bus must travel further to serve the same route from depot 104 than from depot 103, increasing costs due to a driver who is paid by the hour, which would be detrimental to depot 103 operator's objective. Having multiple objectives may be resolved by treating each operator's objective as a sub-objective to an overall objective. Such sub-objectives may be combined or helped to be combined by expressing both sub-objectives in monetary terms by accounting for carbon credits or carbon tax corresponding to the GHG emissions. Furthermore, the sub-objectives may be combined at the time (on the fly) or in advance by having the operators agree on a balance between their respective sub-objectives for the optimizer to take into account in order to "break ties", particularly in the example case where the sub-objectives are conflicting. This balance may be 'tuned' at regular intervals, with the help of the system, by its users. For instance, the same transit company might have a policy to favor GHG reduction and cost reduction in a 0.6:0.4 ratio, for example which may apply after converting the GHG emissions to monetary terms, or before doing so. Each operator's sub-objective does not necessarily need to apply to all depots and can apply only to their depot or some other subset thereof. For example, consider a country-wide, long-distance electric bus service whose west and east regions' operators are rewarded separately for their region's collective GHG reductions or cost reductions. Each operator cares neither about the other region's depots' performance nor solely about their own depot's performance.

The term 'depot' is used very generally. For example, it may refer to a premises for parking or storing multiple vehicles, or it may refer to a single charge point for charging a single EV. More generally, a depot may generally refer to a place for parking or storing vehicles, or a place for transferring people or goods to or from vehicles, such as a bus depot. In addition, a depot may be used for maintaining or repairing vehicles, including the fueling or charging of vehicles. In addition, vehicles may exchange data with the depot when at the depot, for example when larger amounts of data are to be transferred, for instance to avoid or reduce the cost of using wireless communication services while away from the depot such as cellular or satellite communication services. Moreover, the reference to depots in the present disclosure is not meant to be limiting. For example, a depot may include a large depot for handling multiple vehicles, or a depot may refer to a single charging station or charge point, for example along a roadway. In addition, the present disclosure applies to EVs and charging infrastructures that do not necessarily include any vehicle depots.

As background, in relation to terminology, a charge point, sometimes referred as a piece of electric vehicle supply equipment (EVSE), is a physical device that delivers power to one or more EV. A charge point generally has some form of power connector or interface, such as a cable, socket, or induction plate. A charge point may have multiple power connectors or interfaces, for example to accommodate different types of connectors, but generally it may only charge one EV at a time. A charge point is akin to a gas pump at a gas station. A charge point connector is akin to a fuel pump hose at a gas station. Furthermore, a charging station is a physical device or structure that has one or more charge points. A charging station may have a user interface that is common to the one or more charge points. A charging station is akin to a gas pump at a gas station, which may have multiple fuel hoses. An EV charging station with multiple charge points is akin to a gas station, which may have multiple gas pumps. In some instances, it may be considered that all charge points in an EV charging station must be operated by only one operator.

The term 'fleet' is used generally herein. It may refer to a group of vehicles of an organization, such as a transit company, a delivery company, taxi service, and so on. However, it may more generally refer to merely to one or more vehicles which may not necessarily be associated with one organization.

Now, a few example and non-limiting use cases are described to illustrate some concepts according to the present disclosure. Generally, EVs stop at depots to pick up people or goods, drop off people or goods, undergo maintenance or replenish consumables, exchange information with the rest of the system, or merely charge their onboard batteries, depending on the purpose and needs at any given time of the EV fleet, a network of EV depots, and the system at large.

Note that in each of the following examples, the purpose of the fleet and depots and system may be constant, as is generally typical. However, systems and methods according to the present disclosure may be realized with a mixed fleet in which not only may its EVs be of different types, but the system may serve different purposes at different times, at the same time, or on an EV-by-EV basis. For instance, if an EV is sufficiently well-suited to multiple tasks, it may be used both as a public transit vehicle to move passengers, and as a delivery vehicle to move goods. Overall, the system may also be used for multiple public transit networks or multiple logistics networks.

Example: A Public Transit Network

A system is implemented specifically for a public transit service of a city. In this case, the EV fleet may be or include a fleet of electric buses, and the network of EV depots may be the network of bus depots throughout the city. Unless a depot is combined with, for example, a bus loop or train station, the EVs do not stop at the depots themselves to pick up or drop off transit users, but do so over the course of regular bus routes. The EVs may, however, stop at the depots to charge their batteries, to undergo any necessary maintenance, and possibly to communicate amounts of information deemed too large to exchange over a cellular network to which the EVs may be connected, such as video recordings from onboard security cameras. Other information that is lesser in quantity and/or more time-sensitive, such as trip telemetry and updated detour information, may be received from and transmitted to an EV while the EV is away from the depot, for example via a cellular network or other wireless communication service.

While this example includes information exchange between the EVs and the rest of the system that is not necessarily vital to its operation or goals of optimally controlling an EV fleet, the example demonstrates how the system aligns with and may be integrated with the purposes, needs, and technologies of the fleet, namely those of public transit. The example may be similar and readily adapted to other applications, such as a school bus company, taxi company, airport shuttle service, jurisdiction of emergency vehicles, etc. In this example, however, the information of trip telemetry may serve a goal of the fully integrated system, such as optimizing routes (route planning), optimizing which EVs are assigned to fulfilling which routes when outside a depot, optimizing which EVs are assigned to which charge points when inside a depot, and/or optimizing the amount of power flow from each charge point into each plugged-in EV over time. These goals, among others, may be fairly universal across many applications, but may be constrained or informed by the specific application for which the system is implemented.

Example: A Transportation/Logistics Network

In another example, a system may be implemented specifically for a logistics network or company. The EV fleet may be a fleet of delivery EVs, and a network of EV depots may be a network of charging depots likely to be combined with fulfillment centers. The EVs stop at the depots to pick up and drop off goods and charge their batteries. The EVs may exchange information such as live location data and new orders with the rest of the system via a cellular network or other communication service.

Figure 2:
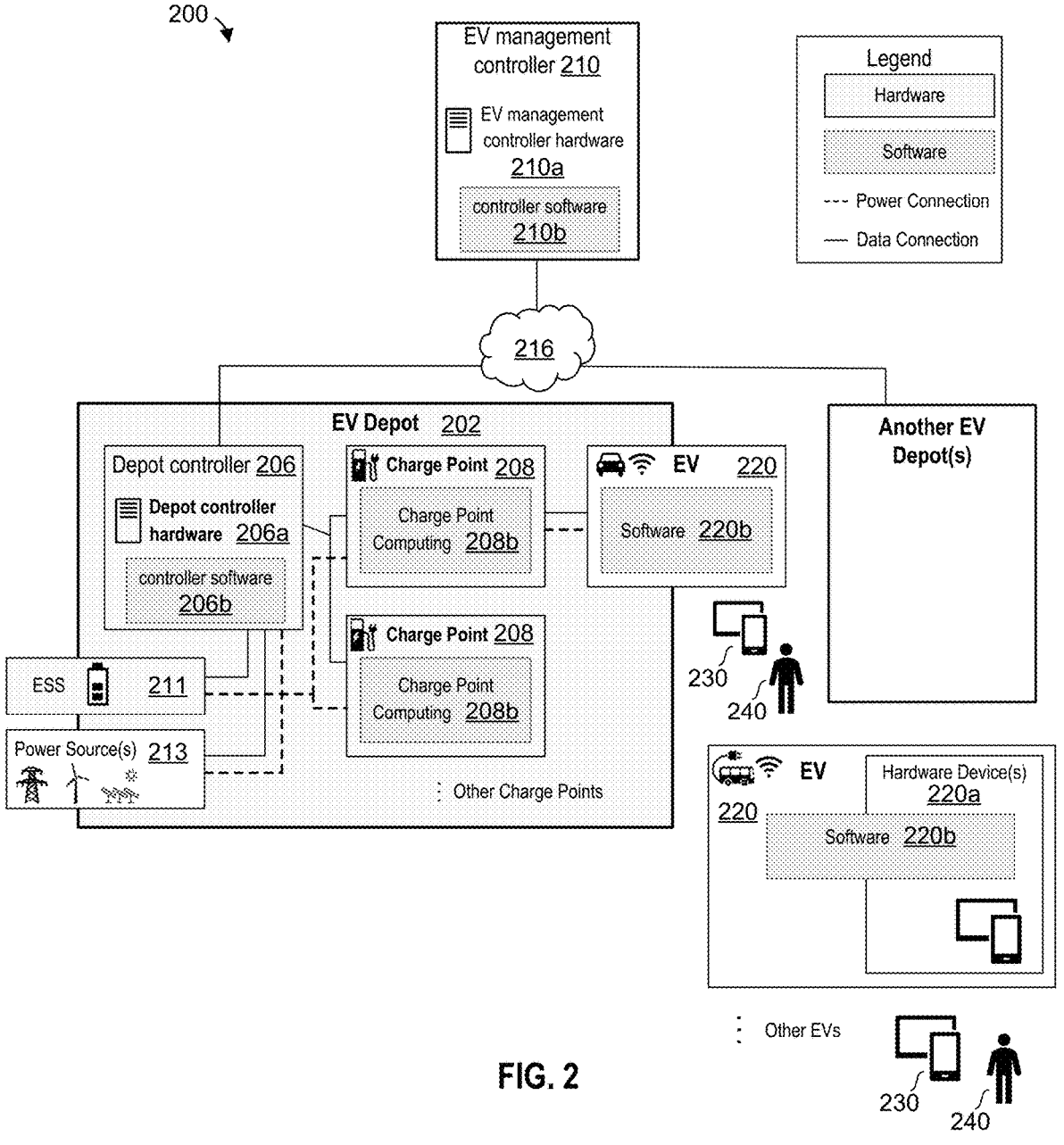
FIG. 2 is a block diagram of an example EV management system having EV charging infrastructure similar to the system of FIG. 1A.

FIG. 2 is a block diagram of an example EV management system 200, which is similar in some regards to the system of FIG. 1A. System 200 comprises a computer based EV management controller 210, one or more vehicle depots 202, each having or associated with a computer based depot controller 206, one or more EV charge points 208 (EVSE), and one or more EVs 220. EV management controller 210 may communicate with one or more depots 202 in any suitable way, including over any suitable communication channel, connection, or network 216, which may include the Internet. In general, for simplicity, references herein to the internet include other communication networks and communication channels other than the internet. Furthermore, FIG. 2 shows some example data connections between components or subsystems, in solid lines, and also shows some example power connections, in dashed lines.

Depot controller 206 may include computer hardware 206a, such as a server(s) or other computing devices, as well as software 206b running on the computer hardware. Depot controller 206 may be implemented partially or fully at depot 202, meaning locally, although some or all of controller 206 may be implemented elsewhere, such as remotely. In addition, a depot controller 206 may control one or multiple depots, and/or a depot 202 may have or be associated with multiple depot controllers. Furthermore, there may be one or more EVs 220 associated with depot 202. Furthermore, depot 202 may have or otherwise be connected to one or more power sources 213, for example at least to provide power to the charge points 208, but possibly to also provide power to other parts of depot 202, including computer hardware, ESS 211, or buildings of the depot, and so on. EV management system 200 may account for power used by other parts of the depot 202. For example, the system may ensure that the combined contribution of this power and the EV charging power respect limits of the depot's grid connection, by adjusting the EV charging as appropriate. In addition, depot 202 may optionally have or be otherwise connected to one or more energy storage systems (ESS) 211, such as a battery ESS (BESS). In general, an ESS may be any suitable type of ESS, including but not limited to a battery ESS, an ESS that stores hydrogen gas, or compressed air or other gas, or stores potential energy in the form of gravity, and so on.

The one or more power sources 213 may include any suitable power sources, for example a power grid, renewable power sources, and so on. A power source, such as a renewable power source, may be located at or near a depot. In addition, power does not necessarily have to be electrical power. For example, power flow into or out of an ESS or EV may be in the form of hydrogen gas, particularly in the case of hydrogen fuel cell electric vehicles, or other forms such as compressed air.

Furthermore, a source of power does not necessarily need to be constant or reliable. A power source may be intermittent, as in the cases of some renewable sources, such as wind and solar power. Such intermittency may be accounted for and optionally provisioned against by an optimization performed by system 200, for example in the case of being able to forecast energy availability and/or being able to control energy storage in and delivery from ESS(s) or even the batteries of plugged-in EVs. Doing so is an example of shifting the supply of energy from one point in time to another. Although the demand of the system for energy may be similarly shifted or lessened if energy consumers of system 200, for example charging EVs and ESSs, are controlled. These are examples of energy arbitrage.

ESS 211 may be used to selectively store power and release power. For example, at a given time, an EV may be charged using energy stored in an ESS, for example an on-site ESS. Energy from an ESS may be use alternatively or in addition to power from a power grid or other power source. The energy used from the ESS may be replenished later on, for example by charging the ESS from the power grid at a later time, for example when the cost of energy from the power grid is at a lower price point. In another example, the energy used from the ESS may be replenished later, for example by charging the ESS from a renewable power source, for example at a time when there is an abundance of low cost renewable energy available. Additionally, power from an ESS may be used when power from one or more other sources is not available, for example during a power outage. ESS 211 may provide information, for example relating to its state of charge or flow of power, to controller 206. In addition, an ESS(s) may be configured to discharge into a power system or power grid to generally provide additional power to the grid. This may be done, for example, when there is higher customer demand or when the cost of power is temporarily higher. The ESS may possibly enable some additional EV charging during a higher demand period since the ESS can provide additional power beyond what is being provided by other power sources (e.g. power sources 213). The strategic use of one or more ESSs, for example discharging and/or charging, may be part of the optimization (which may include optimal control of EVs) performed by the system, for example by EV management controller 210.

In general, a charge point 208 may be used to control the flow of power in and out of EV(s), namely, for charging them. A portion of the power available to a charge point 208

(usually most of it since charge point internal electronics use relatively little) is made available to plugged-in EV(s). The term "plugged-in" is generally used to refer to an EV or other device being electrically connected or coupled to a charge point for exchanging power. A charge point 208, or a charging station having two or more charge points 208, may have one or more computing devices or hardware, which in turn may execute software 208*b* to, for example control the operation of charge point 208, which may include controlling a flow of power in and out of an EV.

An EV 220 may be any type of EV, for example a pure EV (with propulsion powered only by on-board batteries), a plug-in hybrid vehicle, a fuel cell EV, or any hybrid combination of technologies (for which terms like "plugged in", "charging", and "charge point" take on appropriately different meanings). An EV may be any form of vehicle, for example a car, truck, bus, tram, train, tractor-trailer combination, forklift, piece of farming or mining equipment, airport ground support vehicle, boat, other electrified marine vehicle, plane, helicopter, electric air taxi, drone, and so on.

EVs 220 may include one or more onboard hardware devices 220*a*. A hardware device may be referred to as a computing device. Examples of onboard hardware devices include a dashboard camera ("dashcam"), an computer system of an EV, an infotainment system of an EV, an EV navigation system, a mobile phone or other device running software relevant to the system 230, a fare reader in the case of a public transit vehicle, an OBD (On-Board Diagnostics) device, and a driver-operated onboard computer particularly in the case of public transit, a taxi service, or emergency vehicles. Such devices may be incorporated and configured as components of system 200, for example if relevant to the one or more objectives of the system. Onboard hardware devices may include or be used as edge computing devices.

In addition, control information may be provided to a computing device that may not be part of the EV 220 or charge point 208 or other charging infrastructure. For example, control information may be provided to another computing device 230, which may be any type of device such as a smart phone, smart watch, tablet, laptop, as mere examples. For example, a user 240 may have a smart phone configured with appropriate software to receive and output control information associated with one or more specific EVs. Depending on the configuration, control information may be provided to a computing device 230, which may be outputted to a user 240, for example on a display, or audibly via a speaker, and so on. User 240 may in turn take any suitable action in response to the control information, which may include taking action in relation to charging of an EV and/or in relation to operation of the EV.

EVs 220 may include software 220*b* at least some of which executes on one or more onboard connected hardware devices. The software may be configured to implement or otherwise cooperate with EV management system 200, for example to control some of the operation of the EV, which may include controlling charging of the EV (for example charging rate, charging times or durations, etc.). Software may implement other aspects of the EV, such as outputting information to a driver of the vehicle, or in the case of an autonomous vehicle, providing actions and information to the vehicle to control the vehicle. Example actions may include directing the driver or vehicle to specific routes, to specific geographical areas, to specific charge points, indicating when or how an EV is to be charged, and so on.

EV management controller 210 may provide partial or total control and management of an EV fleet and/or EV charging infrastructure. Controller 210 may include com-puter hardware 210*a*, such as a server(s) or other computing devices, as well as software 210*b* running on the computer hardware. Controller 210 may comprise an optimizer, for example an optimizer of the EV management system, for performing optimizations that may be used in controlling an EV fleet and/or EV charging infrastructure. Furthermore, although EV management controller 210 is shown in FIG. 2 as being separate from the one or more depots 202, this is merely an example and is thus not limiting. For example, in an embodiment, some or all of the EV management controller 210 may be physically implemented at a depot or across several depots, or elsewhere. Thus, the illustration and description of hardware and software at various components in system 200, which may provide some control and management functions, is not limiting. Management and control may be physically located at any suitable locations within the system, which may include remote locations as well as the cloud.

While various features according to the present disclosure, including the control and management of EV charging infrastructure and of EV fleets, are generally described as being implemented in software, this is not meant to be limiting. In general, any of the software functionality and features may be provided by a combination of software and hardware.

Now, the control and management of EV charging infrastructure and the control and management of EV fleets is now described. Again, for simplicity, this may be referred to simply as controlling an EV fleet.

Controlling an EV fleet may include any suitable types of actions. The following are merely examples of types of actions that may be determined.

One type of action is where EVs should go in terms of routes over time. This may involve for example optimizing routes (route planning) with respect to EV energy consumption due to the route taken, or optimizing territories for taxi and last-mile delivery applications.

Another type of action is which EVs should take which routes and plug into which charge points over time. This may involve determining optimal assignments between EVs and routes to be taken, and/or optimal assignments between EVs and charge points inside or between depots. These may involve consideration to one or more of EV energy efficiencies, energy capacities, vehicle to charger connection constraints (taking into consideration of the power limitations) and charging rates (for example charging current or power).

Another type of action is providing an indication, for example by sending a signal, to an assigned charge point indicating that an EV is to be charged. The charge point may indicate to the EV an amount of current the EV is allowed to consume.

Another example type of action is when or how an EV fleet is charged via charge points over time. This may involve optimizing an amount of power flow into each plugged-in EV over time. Most generally, this quantity may be negative, representing charging power being instead delivered from an EV to a charge point if bidirectional power flow is supported by both the EV and charge point (e.g., vehicle-to-grid ("V2G")).

Another type of action is whether, how, and when ESSs are charged and discharged over time. This may involve optimizing an amount of power flow into and/or out of each available ESS over time. This quantity can be negative, representing power being delivered by the ESS. It may be any form of power, not necessarily the electrical power in the case of a battery ESS.

An optimization that may be used for generating an action to control an EV fleet, for example how an EV fleet is charged or how ESSs are charged, may benefit from using not only current information but also predicted or forecasted information, for example forecasts of output of EVSEs and/or ESSs power sources, forecasts of other factors that affect the power available to plugged-in EVs (such as other on-site electric loads), or forecasts of factors affecting energy use of EVs (for example traffic, weather, or customer demand), if possible.

The system 200 may generate control information for controlling the EVs and/or charging infrastructure. Control information may include any suitable types of information, and may be generated based on one or more optimizations. Control information may include charging control information for providing control in relation to EV charging, which may include controlling an EV and/or EV charging infrastructure. This may include, for example, assignments of EVs to charge points, charging schedules such as dates, times, and charging intervals, charging rates, and so on. In addition, control information may include EV operation control information for controlling operation of EVs, for example while a fleet vehicle is away from a fleet depot. This may include, for example, assignments of EVs to routes, assignments of EVs to regions, EV route scheduling, for instance dates, times, instructions or suggestions for EVs to use certain charging stations, and so on. EV charging infrastructure may be operated to charge EVs based on the charging control information. EV operation control information may be transmitted or otherwise provided to EVs or associated computing devices for controlling operation of the EVs.

The optimization with respect to objectives is now discussed. An objective of an optimization performed by the EV management system 200 may be any suitable objective. Example objectives are described elsewhere in the present disclosure.

In general, an optimization problem is typically defined by one or more decision variables, one or more objective functions, and (if a mathematical optimization problem rather than reinforcement learning (RL) based) optional constraints and bounds on the decision variables. Generally, each objective has its own objective function. An example of an objective function is maximizing profit by controlling the decision variables at hand. The variables of an objective function that the optimizer may modify correspond to the decision variables of the optimization problem. For computing purposes, an objective is a numerical quantity defined by an objective function, which is a mathematical function of one or more decision variables. Decision variables are controllable, numerical quantities or values that may be optimized such that the resulting value of the objective function is minimized or maximized depending on which is desired. A solution to an optimization problem consists of a numerical value decided upon, by means of optimization, for each decision variable.

An example of a set of decision variable(s) is the amount of power that should flow through each piece of EVSE, where each amount of power may be treated as a decision variable to be controlled for the purposes of optimizing the objective. Another example of a set of decision variable(s) is the amount of power that should flow into or out of any ESS(s). Part of what may make an optimization performed by the EV management system coordinated is that optimal values can be found for multiple sets of decision variable(s) at the same time by doing so as part of one optimization problem whose objective function(s) involve all of the decision variables involved, for example, optimizing the control of EVSE and ESS(s) together toward the same objective(s).

Multi-objective problems have multiple "sub-objective" functions, which are often conflicting, meaning that an optimal solution for one generally corresponds to a sub-optimal or poor solution for the other, or vice versa. For example, minimizing GHG emissions may unfortunately come at the cost of maximizing earnings. The solution to a multi-objective problem generally attempts to balance the minimization/maximization of the sub-objective functions, not necessarily choosing the optimum value for any one of them. The sub-objective functions may be made to contribute to one, larger objective function. For example, if GHG emissions is one objective (to minimize), and earnings is another objective (to maximize), an overall objective function can be realized by ensuring that each of these sub-objective functions are expressed in monetary terms, such as by factoring in carbon tax or carbon credits. The solution to the larger, monetary objective function may be optimal while the corresponding values of its sub-objective functions are not. The optimizer may not decide on the solution that minimizes GHG emissions nor the solution that maximizes earnings, but a solution that results in relatively low GHG emissions and relatively high earnings.

As another example, consider peak power load at a fleet depot as one objective function (to minimize) and time-of-use electricity costs as another objective (to minimize). These may be re-expressed as sub-objective functions contributing to a monthly electricity bill to be minimized. If objectives cannot be realized as sub-objectives of a larger objective through, for example, monetary terms, then subjectively chosen weightings can be used, thereby resulting in the sub-objectives being subjectively optimized. This allows users of the EV management system to specify which of the sub-objectives to favor and by how much. It often makes sense to change the weightings because, in general, each time the optimization problem is solved, its subjectively optimal solution depends on the specific parameters of the problem, which often change from an instance of the problem at one moment in time to the next. For example, the balance between minimizing GHG emissions and maximizing earnings may change over the course of a day.

The EV management system may facilitate operators' choosing and re-tuning of the weightings' values. As part of the EV management system, operators may be regularly notified to update/re-tune the subjective weightings, or alerted to do so when some expiry period has ended or when an assumption made by the operator(s) when choosing the weightings no longer holds, such as when the ratio between the optimal values of a pair of sub-objective functions exceeds a predefined threshold. For example, operators may be reminded by the EV management system to re-tune the weightings every month to reflect new climate change mitigation goals. Or, for example, operators may be alerted when the ratio between optimal values of GHG reduction and cost reduction sub-objective functions changes significantly, such as when clean energy generation becomes even more economical and the two sub-objectives are no longer as conflicting. This adds robustness to the system.

Now, an optimization problem's bounds and constraints limit which values of the decision variables or combinations thereof are feasible per the optimization problem. What might normally be formulated as a hard constraint (e.g., requiring that a minimum amount of energy be delivered to an EV before it unplugs) may instead be formulated as a soft constraint, as part of the overall objective function, with a penalty or reward to the objective (e.g., a penalty proportional to the amount of energy that went undelivered). This may be a requirement rather than an option for optimization problems solved as an RL exercise. This may be valuable if the peak curtailment is desired however not a strict requirement, meaning it is not a "hard constraint". In this case, the penalty or reward associated with the soft constraint may be sized by a subjective weighting factor which, like those for sub-objective functions, may be chosen or re-tuned as desired or as prompted by the EV management system.

FIGS. 1C and 1D illustrates an example optimization problem whose decision variables x1 . . . 4 are the amount of energy to deliver to two buses a and b in the 1st and 2nd hours of a two-hour optimization horizon, subject to constraints for the minimum amount of energy to deliver to each bus. x1 and x3 refer to the 1st and 2nd hours for bus a, and x2 and x4 for bus b.

FIG. 1C at (a) shows how the decision variables' values affect constraint functions ca and cb corresponding to the buses, and how they affect an objective function f1 for $CO_2$ emissions considering an energy mix over time such that 2 kg $CO_2$ would be emitted per kWh of energy consumed in the $1^{st}$ hour and 3 kg $CO_2$ in the $2^{nd}$ hour. This exemplifies a single-objective optimization problem.

FIG. 1D at (b) shows how, if there is another objective function f2 for TOU cost considering energy prices $4/kWh and $1/kWh in the 1st and 2nd hours, respectively, then f1 and f2 may be combined as sub-objective functions of one, larger objective function f by first multiplying the value of f1 by the price per kg $CO_2$ emitted due to carbon tax ($2/kg $CO_2$) such that both sub-objective functions are in monetary terms. As a result, the optimizer would favor charging the buses in the 1st hour (subject to charging power limits not shown).

FIG. 1D at (c) shows how f1 and f2 may instead be combined using subjective weightings. FIG. 1D at (c) also shows how the minimum energy constraints for buses a and b may be converted from hard constraints to soft constraints, as part of the larger objective function, using further subjective weightings to penalize the amount of energy left undelivered to each bus. The optimizer would charge the buses less than the "required" amount if deemed worth the $CO_2$ and cost savings according to the weightings. Their weightings are 0.5 and 0.1, respectively, meaning that the optimizer would prioritize minimizing CO2 emissions. The penalty factor for the buses a and b are 0.25 and 0.15, respectively, meaning that the optimizer will favor charging bus a.

The EV management system 200 may compute the objective function(s), and any constraints, for each optimization it performs. The optimization may be performed by any suitable optimization algorithm or solver, such as a linear programming solver, or by a different algorithm altogether, such as a reinforcement learning (RL) based optimizer. Other examples of optimization algorithms or techniques include operational research, constraint programming, basic heuristics, rule-based elements, and any mixtures of such algorithms and techniques.

Receding-horizon optimization is now discussed. The EV management system may perform optimization for a single interval or point in time. In at least some other embodiments, the system may involve a receding-horizon optimization scheme. This may sometimes be referred to as receding horizon control. In receding-horizon, which may utilize forecasts, the decision variable values may be planned, by means of the optimization, for each point in time or time interval in a horizon into the future, referred to as an optimization horizon. The horizon may start with the current point in time or time interval in the operation of the system, whose decision variable(s) are the only ones taken to perform an action in the system because they pertain to its current state and what is currently feasible. In an example of EV charging control, the actions may relate to charging of EVs such as schedules, charging rates and so on. Such optimization may be repeated with each subsequent point in time or time interval as the horizon moves forward in time, making use of new knowledge of the updated situation for which the optimization is performed, such as a more accurate forecast or an observed value instead of a forecasted one. A receding-horizon control scheme is generally able to utilize information relating to the current state of the system in order to predict future states and control inputs for the system. Receding-horizon optimization allows for planning ahead, such as by charging plugged-in EVs more than currently necessary knowing that more will soon arrive and use a share of charging power, charging an ESS in advance, and so on.

An example is now described with reference to the system shown in FIG. 2.

In this example, software components that perform computational tasks, such as optimizations, may include one or both of EV management controller software 210b, which may include cloud based software, and depot controller software 206b. System 200 may be configured to function as follows.

EV management controller 210 may be configured to execute software 210b that performs computationally expensive tasks, which may include tasks that are relatively time insensitive. This may include, but is not limited to the processing of data or other information, generating predictions or forecasts, potentially using machine learning, for example of the output of power sources, power consumption (e.g., that of on-site electric loads), the price of energy, and so on. In addition, this may include performing optimizations. Furthermore, this may include training and/or inference of machine learning based systems, including but not limited to reinforcement learning (RL). Training a model on a dataset is such that the model may be used for inference, meaning that it may be numerically evaluated on certain new data to perform optimization or plan for possible trajectories. Model training may be online, meaning that it is done repeatedly and possibly automatically using recently available data, such as with every time model inference is performed, such that every model inference is done using an updated instance of the model.

The execution of certain software, including those noted above, on such cloud based system hardware may leverage one or more accessibility, cost effectiveness, efficiency, flexibility, scalability, reliability, software security, and physical security of off-site cloud computing hardware.

In addition, the above kinds of computational tasks are not necessarily mutually exclusive. They may be synergistic. For example, the expected outcomes of making a variety of choices may be simulated or forecasted, potentially doing an optimization to only consider the best outcome of each choice, and then the choice whose outcome is best may be made. In an environment, there may be a close, time-variant relationship between what is directly controlled as a result of optimization and what is not being directly controlled by it. For example, consider an electric bus depot wherein (a) the amount of power delivered to each charging bus at any given time is optimized, and (b) there are not enough charge points to have all of its buses plugged-in simultaneously, meaning that a queue of buses forms at each charge point. Not only does each bus's time of arrival at the depot matter, but also when the bus(es) ahead of it in its queue (if any) finish charging and can depart. The queues' behavior and optimization affect each other. The optimization of power affects when a bus is considered "fully charged" and can be dequeued such that the next waiting bus can plug in, which in turn affects when and for how long power can be delivered to it according to subsequent optimization. Because a receding-horizon optimization scheme may benefit from knowing when the EVs will be plugged-in and thus available to charge, the EV management system may benefit from running simulation trials at an instance in time, in the context of the queue setup, of how the interplay between the queueing behavior and optimization plays out over time, to achieve a better expected result. This may be generalized to the EV management system running simulation trials involving both the optimization and the real-world behavior that is not directly controlled by the optimization, to choose the best expected result among the simulation trials in terms of the optimization objective.

Furthermore, the optimizer of the EV management system may use data other than data provided by a depot. An optimizer may receive data from other sources, such as other devices or processes, third party sources, and so on. The optimizer may consume data in preprocessed or in raw format. The optimizer may consume the output of additional models such as predictors. These models may run before their outputs are fed to the optimizer.

Figure 3:
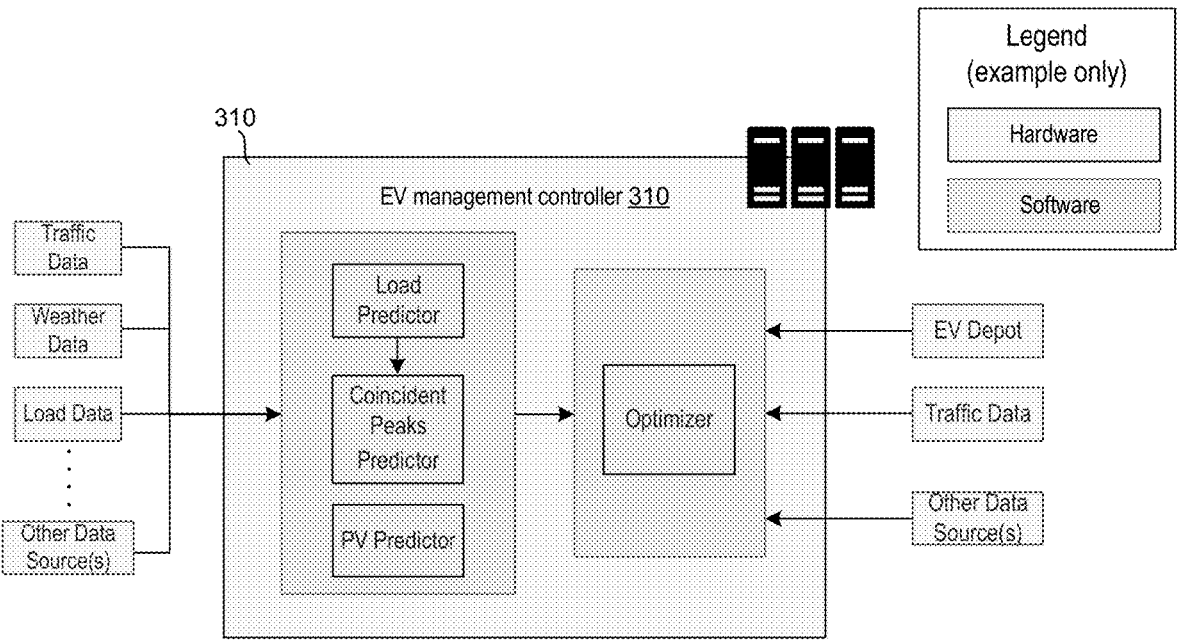
FIG. 3 is a block diagram of example types of data or other information that is provided to the system, for example to an EV management controller.

FIG. 3 is a block diagram showing example types of data or other information that may be used by the system, for example to an EV management controller, such as EV management controller 310. The information may be used by the optimizer, including data that may be used by one or more predictors of the EV management system, the outputs of which may be provided to the optimizer. Example types of information include but are not limited to information relating to traffic, weather, electric load/metering or telemetry data from a power grid or a renewable source or devices consuming power at a depot, user demand, financial data, energy market data, environmental data, contextual data, historical data, real-time data, topology maps or information, etc. Input to the system may comprise one or more of current (live) information, historical information, and predicted information. When the data are received from various sources, they may be mapped or provided to their respective destinations.

An optimization(s) that is used for generating actions may benefit from using not only current or real-time information but also estimated and/or predicted information, for example predictions relating to one or more of traffic conditions, weather conditions, customer demand, cost of power, availability of power from a grid and/or renewable sources, vehicle loading (passengers), vehicle loading (cargo), battery performance based on environmental factors, driver efficiency habits (acceleration, use of regenerative braking, use of heating, ventilation, or air conditioning (HVAC)), route energy requirements (for example topography etc.), energy requirements for likely contingency routes (for example detour due to traffic), and so on. As such, one or more predictors may be part of the EV management system. Estimated and/or predicted information may be generated by one or more of the predictors according to the present disclosure. Where such predictors are used as part of the EV management system, their inputs may be among inputs to the system such that the information used by each predictor is provided. A predictor may include any suitable type of model or algorithm or calculation, and may be based on machine learning (ML) techniques. Besides the purpose of training an ML-based predictor, some historical information may be provided to a trained predictor to be used to make its prediction. For example, a prediction of on-site solar generation may be based on its historical generation, historical weather, etc. Similarly, a predictor of EV arrival information, for example which may include one or more of when EVs will arrive, how many will arrive, their SoCs at arrival, and so on, may be based on similar historical information. Again, arrival generally refers to when an EV becomes available for charging, for example when it connects to a charging power source. For example, on Tuesdays in March between 8 am and 9 am, there are historically 8 EVs that arrive, for example at a depot. Other input to a predictor may be used, for example traffic or weather information, which may be historical, current, or predicted, which may potentially modify the predictions. For example, bad traffic or weather may delay the arrivals of some EVs, and so on. Other predictors may generate other types of predictions in similar manners, for example based on historical, current, and/or predicted information.

FIG. 3 shows an example embodiment comprising an EV management controller 310 comprising a first stage having various predictors, including a load predictor, coincident peaks predictor, and photovoltaic (PV)/solar predictor, and a second stage having an optimizer. A load predictor may predict any suitable type of information relating to load, for example electrical load in a power system (e.g. a power grid, etc.), load at a vehicle depot or other location or building, load at a charging station, and so on. Note that "coincident peaks" refers to times when electricity consumers, as part of the electrical grid/system, consume a maximum amount of power or energy relative to some wider timespan. For example, it may refer to the top five hours of the year when industrial electricity consumers consume peak amounts of energy, for which these customers may be charged a large premium. A coincident peak predictor may predict or forecast these times of other consumers' peak consumption such that they may be avoided and electricity costs may be reduced. A coincident peak predictor may take as input consumers' consumption, for example in the form of output of the load predictor. FIG. 3 also shows various example types of data or other information that may be used as input, such as weather data, load data, information from a depot, and traffic data. While some components and features are shown as being implemented in hardware and others in software, this is not limiting as they may be implemented in software, in hardware, or in some combination. In addition, while FIG. 3 includes various arrows representing example data flows, these are not limiting. Various information may be provided to the optimizer rather than to, or in addition to, a predictor. Furthermore, various information may be provided to a predictor rather than to, or in addition to, the optimizer.

In some embodiments, an optimizer, for example if ML- or RL-based, may inherently model one or more predictions, thereby inherently including predictive behavior in the optimizer, for example as a result of its training on historically observed values of the signal being predicted and/or predicted future reward. In some embodiments, the optimizer may essentially perform predictions of one or more types of information, and may also receive as input predictions of one or more types of information. Moreover, while some embodiments describe standalone one or more predictors providing output to the optimizer, it is to be appreciated that in other embodiments, the optimizer may perform one or more of these predictions, and the other way around. Thus, references in the present disclosure of optimizations being based on predicted information generally covers both the optimizer receiving predicted information as input and the optimizer essentially perform predictions.

There may be one or many compute modules running on EV management controller 310. In an embodiment, tasks, such as predictors, an optimizer, preprocessing units, and so on, may be grouped or split into multiple compute modules for security or other reasons. In a case of having multiple types of assets, for example EVs, BESSs, and so on, there may be more than one optimizer running for each controllable asset or asset group.

The information that is provided to, or outputted from, the system may include one-time or frequently made inputs or outputs, which may or may not be time sensitive. Examples of one-time inputs are the length of a time horizon for which a receding-horizon optimization is performed, the configuration of a depot, the allowable charging and/or discharging rates of charge points, EVs, and/or ESSs, and the energy capacity of EVs and/or ESSs, for as long as the horizon, depot configuration, etc. are not changed. Such information may be provided in the control environment information. Examples of frequent inputs are a battery energy level/state of charge (SoC) or location of one or more EVs, which may be frequently updated even if their values do not change. An example of a frequently made output, for the case of optimizing how the EV fleet is charged, is an optimal amount of charging power to be delivered to one or more plugged-in EVs. These kinds of frequently made inputs and outputs may be regarded as time sensitive, especially if optimizations are done frequently.

In addition, the information that is provided to the system may be at least partly sourced from the Internet or any other source, especially if it is publicly available information, and from local software or that of any other hardware devices connected to the Internet. Examples of potentially relevant information made to be publicly available are geographic information, bus routes, or bus schedules. Examples of information from local software are inputs from an operator dashboard on-site at a depot (such as an override or updated depot configuration), plugged-in SoC information of EVs reported by charge points, or on-site trip telemetry information of EVs sent first to local computing hardware, for example via local area network (LAN) or direct wireless connection such as Bluetooth.

Generally, a controller according to the present disclosure, such as an EV management controller and/or a depot controller, may be provided with information that includes control environment information. The controller may use the control environment information to generate control information for the system, for example charging control information and/or operation control information. Control environment information may generally contain information relating to the current and/or recent control environment, and/or historical control environment information. Control environment information may include EV information, charging infrastructure information, and any other suitable information. Control environment information may include any types of suitable information including those described previously and elsewhere herein.

In an example embodiment, a controller such as EV management controller 310 may generate control information based on at least one or more of the following information. For each EV that is currently charging, the information may include a target charging completion time (which can include date and time), a target EV battery SoC for example at target charging completion time, and/or the charging rate being used. This information may be known or predicted, or some combination of both. A remaining amount of energy desired or needed by the EV at a given time may be calculated and represented in any suitable way, for example by the difference between the current SoC and the target SoC.

In addition, the information used by the controller may include information relating to EVs that are predicted to plug in during a time period, for example an optimization horizon. For each EV that will plug in, the information used by the controller may include information relating to predictions of arrival times of EVs during the time period (e.g. times EVs become available for charging, for instance when they plug into charging points), target SoCs of these EVs, target charging completion times (departure times), and/or charging rates. This information may be known or predicted, or some combination of both. For example, in a transit application, some information may be known or highly predictable. For example, EVs that are expected to plug in and their arrival times may be mostly known, for example based on scheduling information (e.g. when a bus finishes its route and returns to a depot). Similarly for target charging completion times or target SoCs. In addition, an amount of energy to deliver and/or corresponding arrival/target SoC information may be predicted based on, for example, historical information such as previous energy usage in previous trips and/or on scheduled future trip information (e.g. distance of trip, time duration of time, route, traffic, weather, and so on). An optimization for controlling EV charging based on these types of information may be an improvement over, for example, an approach of assuming a fixed target SoC that might be higher than necessary and detrimental to an objective. For example, charging all buses to at least 90% SoC and limiting their travel before recharging to 120 km. Some busses may only need a SoC lower than 90% to complete their trips, while other busses could readily do trips longer than 120 km or do additional trips that have a combined distance of over 120 km.

Some information used by a controller may be used as hard optimization constraints, for example target SoCs at charging completion or target departure times. Such information may be important for EVs that are used to fulfil a schedule. Furthermore, some information used by a controller may be treated as soft constraints and may be incorporated into an optimization objective such that the controller may attempt to satisfy the soft constraints as much as possible but is not required to do so (a solution is possible while not satisfying a soft constraint). For example, the controller may attempt to deliver as much of the target SoC as possible, although the controller may decide to sacrifice the delivery of some target SoC to perform some peak shaving, to minimize energy costs for example based on time of use pricing, to minimize GHG emissions, or to optimize for other objectives.

Other types of information used by the controller may include information relating to constraints or other limits, for example of electrical infrastructure (e.g. at a vehicle depot or charging station) and so on. Other types of information include current values and/or predictions, for example over an optimization horizon, of any on-site renewable generation or any auxiliary loads. This may be relevant to circuit constraints and, if used, to an objective function related to peak shaving.

Reference is now made back to FIG. 2.

Depot controller 206 may be configured to execute controller software 206*b*, which may include software that performs less computationally expensive tasks, for example relative to software that may be executed at EV management controller 210. Furthermore, controller software 206*b* may be configured to execute software that is more time sensitive. In these regards, system 200 may be configured with a center-edge architecture, where depot controller 206 may be considered in some instances to be an edge based component, while EV management controller 210 may be considered a center based component. Controller 206 may comprise an optimizer for performing optimizations used in controlling an EV fleet and/or EV charging infrastructure.

Edge architecture generally refers to a distributed computing architecture that includes components that are active in edge computing. Edge computing generally refers to computing that is done at locations closest to end users or data of the system. In other words, edge computing occurs closer to a source or destination of information used by the system. An edge architecture may enable processing to be done more quickly, for example by reducing lag and latency. Software running at an edge is often capable of responding more quickly and efficiently, for example to user interaction or data. This may result in improved overall performance or improved user experience.

In some embodiments, edge processing may be performed at other devices, for example at EVs 220, charge points 208, ESSs 211, or power sources 213.

Example types of tasks or operations that may be performed by depot controller 206 include the following.

One example is relaying, and optionally pre-processing, information received from other connected hardware devices, for example at the depot, before sending it to EV management controller 210. This may include converting it from one form to another.

Another example is relaying, and optionally post-processing, information received from EV management controller 210 or the Internet or elsewhere before sending it to other site-connected hardware devices at the depot, such as, in the case of EV charging power optimization, charge points or plugged-in EVs. This may include converting the information from one form to another, for example as instructions to an operator or commands to a charge point or plugged-in EVs. The information received from EV management controller 210 may be the output of optimization(s).

Another example is running an operator dashboard.

Another example is performing at least some of the tasks of EV management controller 210. In an embodiment, depot controller 206 may be configured to perform one or more tasks of EV management controller 210, possibly in simpler form. This may be done by depot controller 206 for example in the case of an internet outage or power outage at EV management controller 210. The tasks of EV management controller 210 may be simplified when executed at depot controller 206, for example since depot controller 206 may have fewer computing resources.

Running software tasks on computer hardware at a depot, such hardware 206*a* of depot controller 206, may leverage the proximity of, for example, servers that are on-side or close to a depot, and the fact that information may be exchanged without an internet or other network or communication connection, which may be unreliable. Furthermore, on-site servers may be used when privacy concerns, for example of users, company policy, or government regulations, require it.

In an embodiment, if the hardware 206*a* is running the controller software 206*b* and hardware 206*a* fails partially or fully, or if there is no hardware 206*a*, then software tasks may instead be performed at EV management controller 210.

Furthermore, in a case of loss of connectivity with EV management controller 210, depot controller 206 may perform some or all of the operations of EV management controller 210, including optimization. In an embodiment, controller software 206*b* may be configured to have a default optimizer policy, such as a simple rule-based policy, instead of a more sophisticated optimization, as a fallback.

Although not shown in FIG. 2, a user interface for an operator or other user of a depot may be a human-machine interface and may present information to and/or receive information inputs from users. Information that is presented and received may be one-time-specified information (e.g., a depot configuration as long as it does not change) or information that is updated (e.g., user-specified system objectives, or outputs of an optimization that are presented to a user). The information may be communicated in any appropriate way, e.g., visualized. Information may be presented to operators on-site at a depot for monitoring or testing purposes, for system checks, or as instructions to be carried out such as in the case of a partial or full system failure. The information may also be presented and available to humans and/or computerized systems via Application Programming Interfaces (APIs) for further processing.

If system 200 is configured to optimize, for example, the routes to be taken by EVs, EV-to-route assignments, and/or EV-to-charge-point assignments, then the resulting actions or instructions may be at least partly in the form of directions provided to dashboards of EVs or any other suitable connected hardware devices onboard, which may include a portable electronic device such as a mobile or smart phone, or a tablet, and so on. Such directions may be as simple as a charge point or route number, or more elaborate to include for example map directions. In a case of partially or fully autonomous EVs, directions may be provided to EVs themselves to be followed.

Depot controller software 206*b* may include a charge point management system (CPMS), which may enable the management of EV charging by monitoring or controlling one or more charge points. Additionally or alternatively, the CPMS may function by monitoring or controlling plugged-in EVs themselves. In the case of optimizing an amount of power flow into each plugged-in EV, for example, the CPMS may be used to issue charging commands to each corresponding charge point or plugged-in EV. An example type of direction may be to charge EV 1234 at charge point 567 on Jan. 1, 2023 between 4 am and 6 am at 5 kW.

A charge point 208, for example software 208*b*, may monitor and control the charging (and potentially discharging) of one or more EVs 220 that may be plugged into the charge point 208 at any given time. In addition, charge point 208 may implement charging policies, including simple policies, where simple may mean that no optimization is performed. Furthermore, if optimizing an amount of power flow into each plugged-in EV over time is one of the tasks performed on another piece of computing hardware, such as EV management controller 210, then charging power, a setpoint of the charging power, or the charging policy, may be dictated by that optimization for each charge point 208 for each EV 220 plugged into it. The same may apply for any other optimizations or computational tasks that may require controlling a charge point 208, in which case control may be granted by system 200 as long as there are no conflicts between what the charge point is able to do and what the optimized action for the charge point is.

Similar to charge points 208, an ESS 211 may control and may implement a control policy for the power flow into or out of its energy storage. This may be done by software running on computing hardware at or associated with ESS 211. If optimizing an amount of power flow into each available ESS over time, then the power flow, a setpoint of the power flow, or the control policy may be dictated by that optimization. The same may apply for any other computational tasks that may require controlling an ESS 211, in which case control may be granted by the system as long as there are no conflicts between what the ESS can do and what the optimized action for the ESS is.

System 200 may include computing hardware and/or software (e.g., a database) dedicated to storing, managing, and fulfilling queries for information, particularly for other parts of system 200.

In addition or instead of operator dashboards at depots, there may be dashboard(s) with the same or similar purposes located or provided elsewhere, for example alongside EV management controller hardware 210a. Dashboard(s) may provide unified and potentially remote monitoring and control of the overall system 200, any of its components, and/or the connectivity therebetween, of which information may include failure notifications or statuses of system checks. Components and/or the connectivity therebetween may be controllable insofar as being able to partially or fully disable them, such as for a manual override or testing how the system manages partial failures on a component level.

An ability may be given to a depot operator through a portal to enable or disable one or more controllable assets from the optimization by system 200, and this may optionally be enabled on demand. This functionality may be valuable for addressing a fault at a single asset or at a system level. In this case, adding or removing decision variables of the objective function(s), including doing so on demand, may result in more meaningful optimization for the remaining/functional assets.

Further, there may be a dashboard intended for customer use instead of, or in addition to, operator use. For example, a dashboard or other user interface may be provided at a shuttle service stop for EV shuttle buses to provide users with real-time updates and allow them to request a bus. Additionally, such a dashboard may offer overrides to shuttle service staff in terms of the information and functionality they provide.

In addition, in some embodiments, not all software components run on computer hardware devices that are owned, leased, or even under control of system 200 owner or operator. For example, EV management controller hardware 210a may not necessarily be owned by the owner or operator of system 200. Furthermore, a software front-end of a dashboard for use by a system operator and/or user, for example, may run as a web page/web application, or application on their own mobile phones or other devices. Such a web page/web app may be hosted by EV management controller hardware 210a or depot controller hardware 206a, and may be hosted within a LAN or, especially in the case of cloud hosting, with the Internet or other network.

Figure 4A:
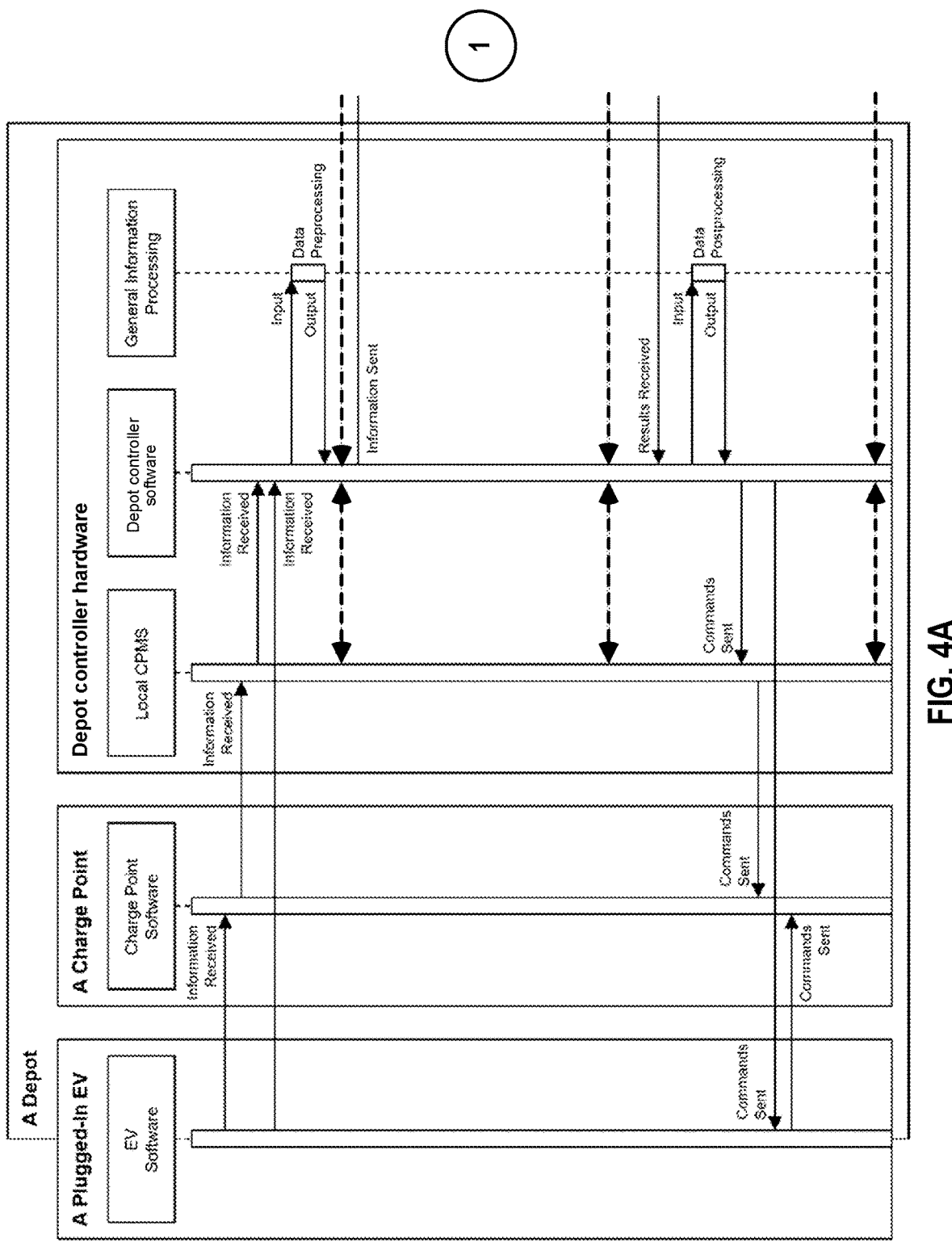
FIGS. 4A and 4B show a sequence diagram of one iteration of an example implementation of a system.
Figure 4B:
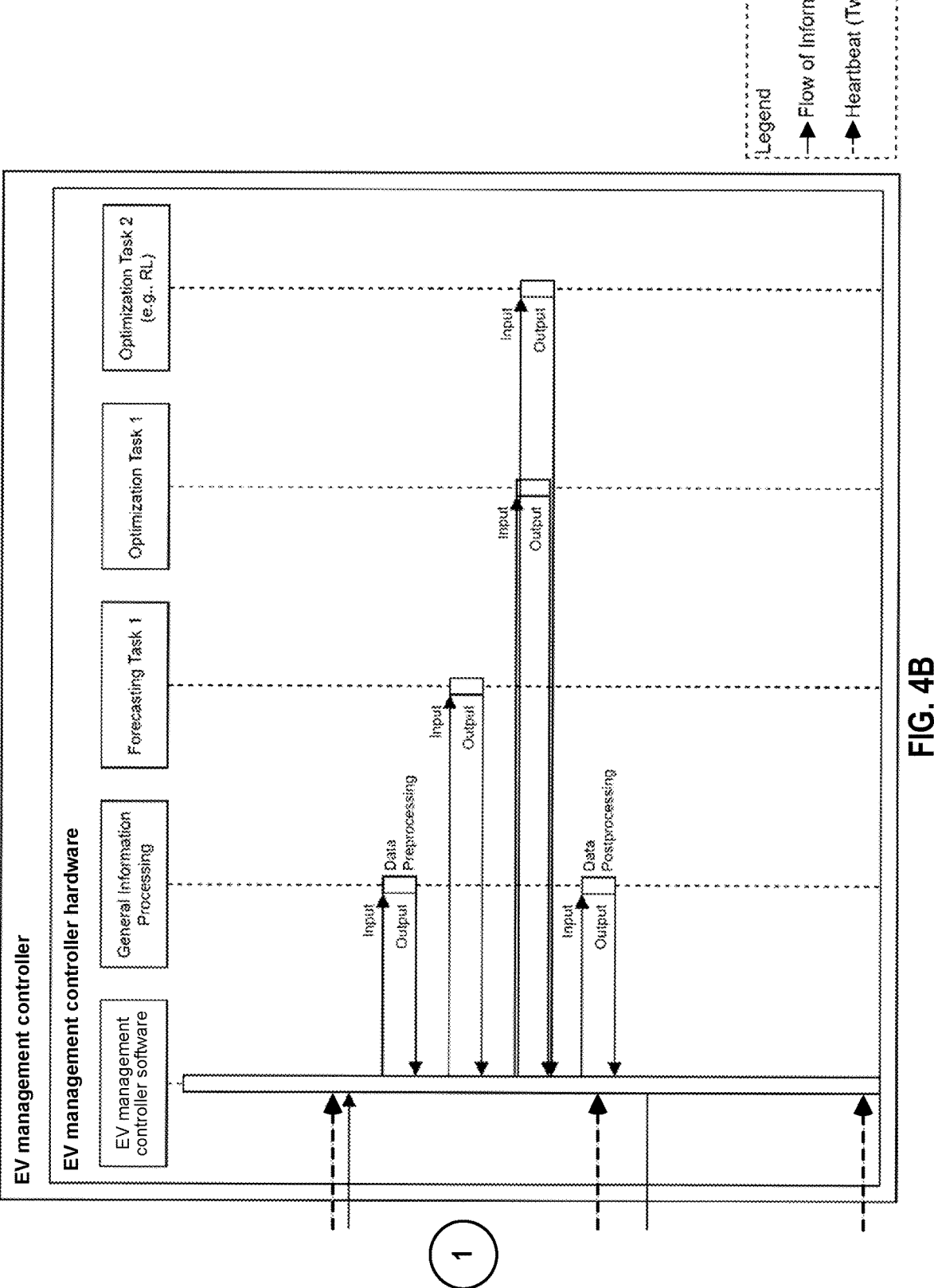

FIGS. 4A and 4B show a sequence diagram of one iteration of an example implementation of system 200, with a flow of information over time between hardware and software components in order to control an example asset (to control EV charging) based on optimization performed in the cloud. The diagram includes some example functions of system 200. The diagram has been split into two halves, and is joined by the number "1"s in each half.

Hardware and software components that may be used in this example may be those which the EV management system either consists of or involves, for example: A depot with local computing hardware and software, software running in the cloud, an example charge point at the depot, and an example EV plugged into the charge point. In this example, information (such as the EV's SoC) is received by the charge point. Information such as this is relayed to the EV management system, such as via the depot's CPMS, running on the depot's local computing hardware. The EV management system's software that runs on the local hardware may perform some information preprocessing before sending information to its further software running in the cloud. This information may include the historical/recent electrical load or generation of a building or energy source at the depot, as an example. This cloud software may, per the example, also perform some information processing and run a predictor to run a forecasting task before running a type of optimizer to perform an optimization task. A forecasting task may include forecasting the upcoming load or generation at the depot, as an example, based on the corresponding historical/recent load or generation. The cloud software sends its optimized solution for how to control the depot's assets to the portion of the EV management system's software running on the depot's local hardware in order to take effect, such as via the depot's CPMS and charge points. Also shown in FIG. 4 is a heartbeat signal that may be sent between the CPMS and EV management system, or between that which runs on the depot's hardware versus the cloud software, for components to indicate to each other that they are continuing to function.

An example of optimization performed by system 200 is now described.

In the example, there is optimization to control (a) how an EV fleet is charged and (b) how an ESS is charged and discharged over time. How EVs in a fleet are charged may involve optimizing an amount of power flow into (or out of) each plugged-in EV over time. EVs do not necessarily have to be plugged-in for an entire optimization horizon. How one or more ESSs are charged may involve optimizing an amount of power flow into each of the ESSs over time. One or more of the values may be negative, representing a discharging of an ESS.

Again, an optimization problem is generally defined by one or more decision variables, one or more objective functions, and optional constraints and bounds on the decision variables. In this example, decision variables relating to how to charge EVs in a fleet may include the charging power level for each EV charge-point connection for each time interval in an optimization horizon. Decision variables relating to how to charge or discharge ESSs may involve an amount of power flow into (or out of) each ESS for each time interval in an optimization horizon. Furthermore, an example objective function may be a total expected cost of energy consumed by the EVs and ESS over the course of the optimization horizon, for which the objective would be minimizing this objective function. The objective function may take into account other information or parameters, for example the price per unit of energy (e.g., per kWh) taken from a power grid to charge the EVs and ESS, and the expected or forecasted power output of other power sources such as renewable sources.

In addition, in this example, constraints may include limiting the optimization problem to what is physically feasible, for example by limiting the total power drawn from the power grid at any given time to avoid exceeding the limit of the grid connection itself (constraint function 1), respecting the energy capacity of the ESS (constraint function 2), and enforcing that EVs are charged to their target SoC (constraint function 3). Bounds on decision variables may also limit the optimization problem to what is physically feasible, such as by respecting a maximum allowable charging (or discharging) power of each connection to an EV, or enforcing that EVs may only be charged when they are available at the depot and plugged in. Minimizing the total expected energy cost, in this example, may result in optimal values for the decision variables over the optimization horizon, from which those corresponding to the current time may be used as setpoints for how much power should flow to EVs, to/from ESSs, etc., such that the resulting control of these assets minimizes the total energy cost over time to the best of the system's ability.

Figure 5:
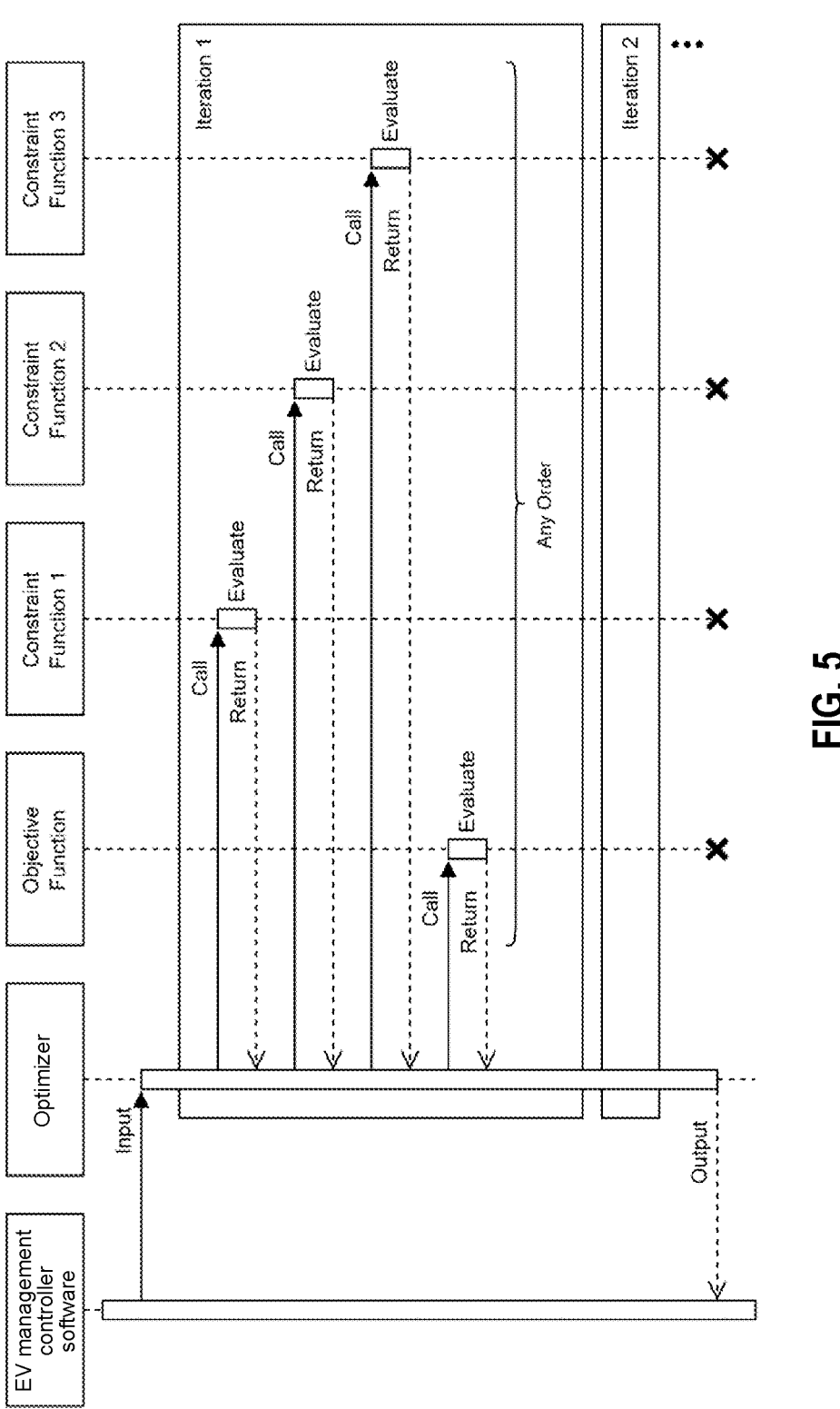
FIG. 5 is example optimization sequence diagram showing one, multi-iteration execution of a numerical optimization algorithm in an EV management system.

FIG. 5 is example optimization sequence diagram showing one, multi-iteration execution of a numerical optimization algorithm in an EV management system according to the present disclosure. An optimizer may be configured to perform one or more optimization algorithms. The optimizer may use any suitable type of optimization algorithm. An optimizer may be partially or fully executed at EV management controller 210 of FIG. 2. Input to the optimizer may include information, for example, cost of power from a power grid, power source output, power grid connection limit, energy capacities of EVs, energy capacities of ESSs, current SoCs of EVs, and target SoCs of EVs by times of departure. These example inputs may be used to define or numerically evaluate the objective function and, per the example, three constraint functions on the values of the decision variables in each of the iterations of the optimizer. An additional input to the optimizer may be an initial estimate of the decision variables. The optimizer may try different values of the decision variables in each iteration, checking whether decision variable values meet all of the constraints, until all constraints are met and the optimizer considers the objective function, in this example minimizing a total expected grid energy cost, to be minimized using the current values of the decision variables. These optimized decision variable values may be outputs of the optimizer. In addition, the minimized objective function value may be an output of the optimizer. It is to be noted that the various operations in an iteration of the optimizer in this example, including those shown in FIG. 5, may be performed in any suitable order.

An example embodiment that uses reinforcement learning (RL) based optimization is now described. It is noted that some of the embodiments and approaches described in the present disclosure, such as some of those described above, do not denote specific types of optimization algorithms or techniques.

In general, reinforcement learning is an area of machine learning, and involves taking suitable action to maximize a reward in a given situation. Reinforcement learning is different from supervised learning in that RL does not require labelled input/output pairs for training. Rather, RL techniques learn using algorithms that learn from outcomes, and then decide the next action to take. After taking an action, the algorithm obtains feedback to determine the wellness of the action given the current information. RL is essentially a self-teaching technique that learns by interacting with the environment. This could be simulated environment mimicking the real world behaviors.

In this example, an RL-based optimizer may be used to determine setpoints or charge profiles for controllable assets in the system, for example plugged-in EVs, charge points, or ESSs. An example setpoint is a charge rate(s). A charge profile generally refers to a profile for charging an EV, which may include charge rate, charging schedule, and so on. Generally, RL policies or models, and thus RL-based optimizers acknowledge the stochasticity of the environment, meaning uncertainty in the transitions from one state of the environment to the next, making RL-based optimizers potentially more resilient in real-world applications. To achieve an optimal performance by the optimizer, the RL policy or model is generally or ideally trained with an environment closely mimicking the real world. This may mean that the training environment may be configured to have certain constraints, such as a power limit of an electrical transformer that electrically connects a depot with a power grid or other power source, power limits of charge points, a configuration of any vehicle lanes at the depot, and so on. As noted previously, constraints may be implemented as soft constraints in the objective function that is used when training the RL policy or model. Constraints may also be imposed by the training environment or masked at the output of the policy. An RL-based optimizer may not need predictor(s) where a non-RL-optimizer might, because an RL-based optimizer does not necessarily need predicted inputs; as part of its training on historical or synthesized data it can, like a machine-learning-based predictor, inherently learn to incorporate some predictive behaviors such as those that would be offered by separate predictor(s). Furthermore, a trained RL model may inherently have some or all of the behaviors (and thus benefits) of a receding-horizon optimization scheme, including not only optimization behaviors but also predictive behaviors and the concept of maximizing expected reward over time.

Inputs to an optimizer of system 200, or to system 200 more generally, may include, for example, one or more of the following. Inputs may include information and data relating to each EV. Additionally, inputs may include information relating to EV charging infrastructure, for example charge points, charge point types and specifications, charge point locations, charge point health or status, charge point maximum charging rates, charging infrastructure topology, maximum power capacity, and so on. Additionally, inputs may include observed and/or forecasted values of on-site electrical loads, such as a load of a building at the depot. Additionally, an input may include observed and/or forecasted values of on-site power generation, such as solar power generation, wind power generation, and so on. Additionally, inputs may include observed and/or forecasted weather data. Additionally, inputs may include observed and/or forecasted indoor and/or outdoor temperatures. Additionally, inputs may include observed and/or forecasted traffic data. Additionally, inputs may include preferred or target departure times of plugged-in EVs. Additionally, inputs may include SoC information of plugged-in EVs.

Information about or relating to individual EVs 220 may be provided to system 200, including optimizer. Example types of information includes but is not limited to EV SoC, battery state of health, location of EV, power input limit, battery temperature, vehicle type, vehicle specifications, EV telemetry data, EV route history data, and so on. This information may be provided from the EV 220 or from a computing device associated with the EV such as a mobile device of a driver or operator, to system 200, for example to depot 206, in any suitable way and time. For example, at least some information may be transferred from an EV 220 when the EV is plugged-in to a charge point 208 at depot 206. Information may be transferred in other ways, for example over a wireless connection such as Wi-Fi at depot 206, or over a wireless cellular or satellite service, for instance when the EV 220 is away from depot 206. This information may help to determine, for example, expected future states, constraints of chosen actions of the RL-based optimizer, an expected time-to-charge, power delivery strategies, and so on. Furthermore, some of this EV related information may be used by the optimizer, or by a predictor that provides input to the optimizer.

During operation, one or more additional constraints may arise, for example due to power limit mismatches. These additional constraints may be found when the optimization is performed rather than in advance. An example of a power limit mismatch is when a maximum charge rate of a charge point and a maximum charge rate of an EV are different. When an EV initiates a connection with a charge point, a charge rate limit may be determined by identifying the lowest maximum charge rate of the charge point, the connector/auxiliary box, and the EV. In general, this can be anticipated for consideration in the receding-horizon optimization scheme, but only if the rate limits of each charge point, connector/auxiliary box, and EV are the same, or which EV will connect to which charge point/connector/auxiliary box can be anticipated or controlled.

Additional depot-oriented data points, for example building load, renewable power generation, weather data, and so on, may be used to determine the net power available to the controllable assets, subject to the net power available to be drawn from a power grid (within a time horizon).

RL is a learning-based method. Thus, during training, it generally learns the relationship between the observations and features of the data. This allows for a policy to drive an inherent linear or non-linear relationship and sensitivity between the parameters and learn the underlying probability distributions between state changes in the environment.

A reward function, which is typically what an objective function is called in RL is used to train an RL model. This is generally a nonlinear function that outputs a reward value to be maximized, or a penalty value to be minimized. Given the current observations by the environment a state vector is created and used as input to the RL model. During inference, the evaluated policy produces actions which are considered to be "optimal" assuming the training environment behaviour is aligned with the real world behaviour. When the produced action is exercised or sent to the environment or end point, the environment (which may be the real world actuator, CPMS etc.) outputs the next observation.

This transition between the states of the environment given the action of the RL-based optimizer may be rated by the predetermined objective function to indicate the performance of EV charging operations resulting from the "best action" being taken. At training, the policy may aim to maximize its cumulative reward (or minimize its cumulative penalty). Thus, a policy may be slowly refined until the reward (or penalty) value reaches a value or threshold that is considered to be satisfactory, for example by a fleet operator.

An objective function may represent one or more subobjectives. Some example objectives are now described.

An example objective may be to maximize charge point availability. This may be relevant in the case of a depot consisting of one or more vehicle lanes which may be where EVs charge up, where the use of lanes dedicated to charging follow, for example, a queueing model. In a first-in-first-out queueing model, an EV that has not yet charged to its target SoC may thus remain in a charging lane, and thus block one or more EVs that have charged to their target SoCs from leaving. Thus, a function to determine a penalty (negative reward) to apply for each instance of one or more EVs being blocked from leaving may drive a policy to "free up" the lanes.

Another example objective may be to charge EVs before scheduled departure times. For instance, an EV may have a required amount of energy its battery needs to receive to reach a target SoC, which takes an amount of time dependent on the charging rate. A reward value may be determined and applied for an instance of a target SoC for an EV being reached before the scheduled departure time of the EV, and/or a penalty value in the opposite case.

Another example objective may be minimizing energy costs in the presence of time series energy pricing (a simple case of which being time-of-use (TOU) pricing). This may be relevant in the case of a grid energy price that applies to a depot being a time series, meaning time-variant, for example changing at various time periods. To minimize a cost of energy, the optimizer may plan in advance, for example for a time duration of an optimization horizon, to charge controllable assets at times when the price per unit of energy drawn from a power grid is less expensive.

Another example objective may be doing peak shaving or load shifting. Peak shaving generally refers to reducing the amount of energy consumed during peak demand on a power grid. An objective of peak shaving may be implemented by minimizing a highest grid power draw expected in the optimization horizon. Load shifting generally refers to moving energy consumption from higher demand periods to lower demand periods with a goal of reducing demand at peak periods. These may be relevant in a case where a depot is subject to peak energy pricing. To minimize the cost incurred by drawing a peak in power from the grid, an objective of the optimizer may be to not exceed, for example, a power threshold for power received from the grid.

Other example objectives include avoiding peaks or performing energy arbitrage, which may both be done using EV(s) or ESS(s) if a depot has them among its controllable assets.

Figure 6A:
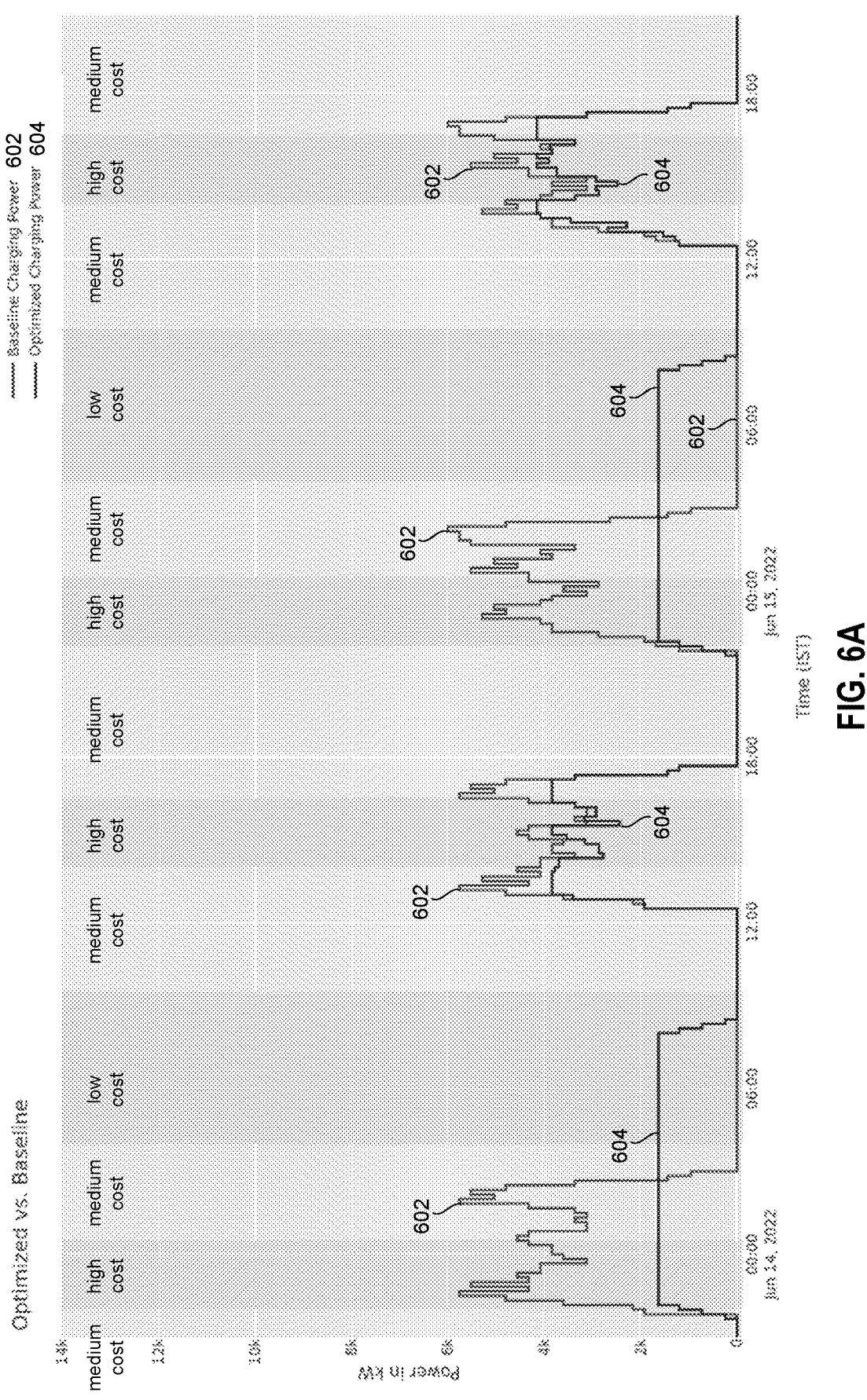
FIGS. 6A and 6B are example optimization simulations of EV charging at a bus depot.
Figure 6B:
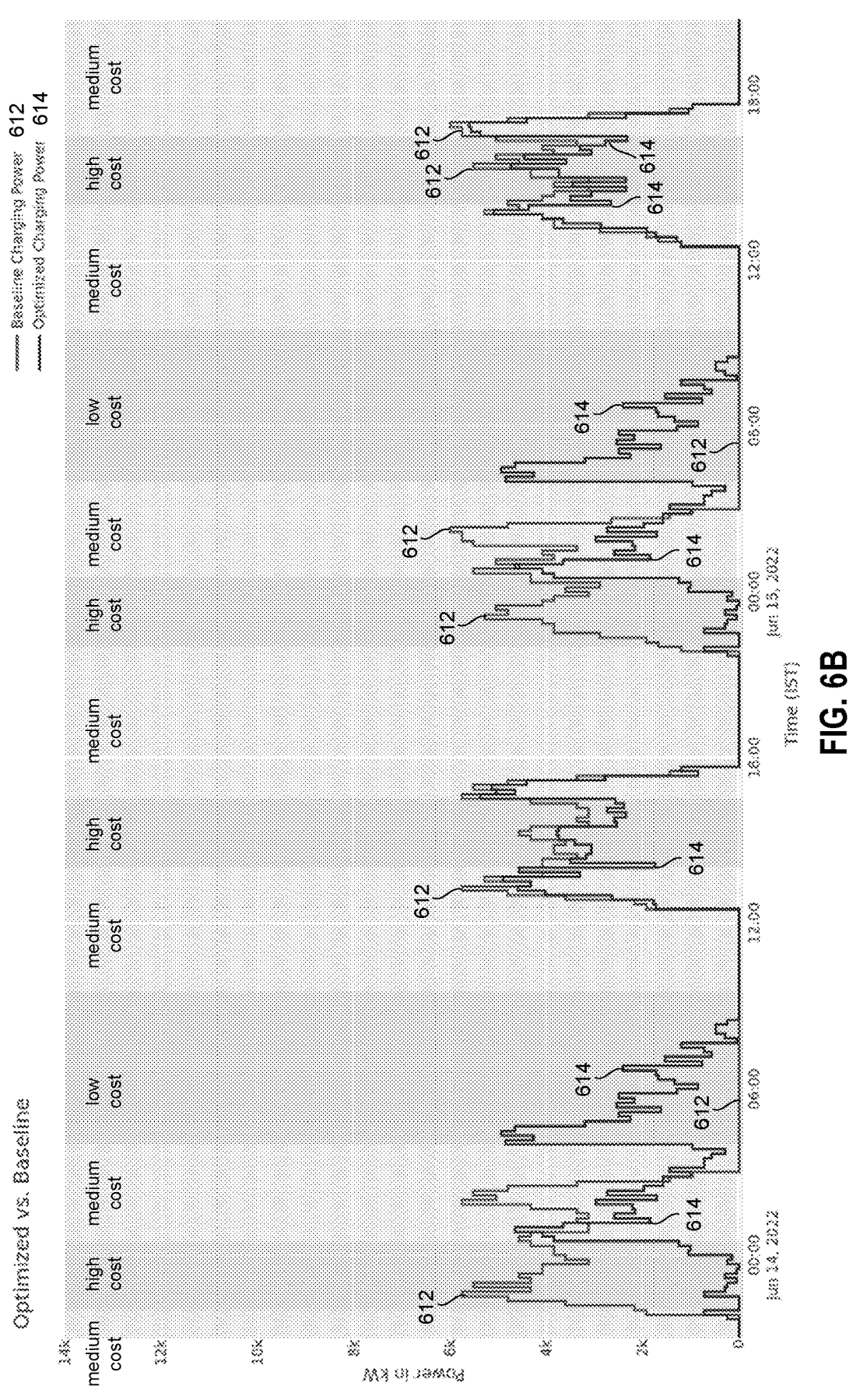

FIGS. 6A and 6B are graphs of example optimization simulations of EV charging at a bus depot. The objectives of peak shaving or minimizing TOU costs, as enabled by an EV management system, are illustrated in the following example of an optimization performed in simulation for an electric bus depot with 100 electric buses. The objectives were optimized by optimally controlling the amount of power delivered to each plugged-in bus via EVSE over time. In other words, the peak power draw and TOU costs are the objective functions to be minimized in two variants of the optimization problem, in which the EVSE power constitutes the decision variables. Both optimization problem variants were solved using a linear programming optimization solver. The reduction in (a) peak power draw and (b) TOU costs was measured with respect to a baseline scenario without optimization, in which the buses start charging as soon as they arrive at the depot and charge as long as necessary to reach their target SoCs. Constraints include the power flow from EVSE to buses being one-way, buses being available at certain times, and the fact that the buses must depart the depot with a certain minimum SoC. The same amount of energy must be delivered to the buses each day between the baseline and optimized scenarios.

FIGS. 6A and 6B show, over a two-day timespan, the bus charging power of the baseline (red lines 602, 612) versus that resulting from one of the two optimization problem variants (blue lines 612, 614). The baseline is the same in both cases. Of particular note for the objective of minimizing time-of-use electricity costs, the red-, blue-, and green-shaded time periods represent high-, medium- and low-cost times in which to consume power, per the TOU pricing scheme. FIG. 6A shows, relative to the baseline, the charging power that accomplishes peak shaving. As can be seen, the baseline peaks at around 00:00 IST on each day are "flattened" into near-rectangles because the buses can leave much later in the morning and their charging can be "spread out" to an extent into the future. On the other hand, the baseline peaks between 12:00 and 18:00 IST on each day are reduced, subject to narrow constraints on when the buses are available to be charged.

Some or all data points received by the optimizer may be considered to be the features of state data representing the environment information. This state information may be in various structures (e.g., Javascript Object Notation (JSON)). Thus, data may be passed through a data pre-processing module to convert the state data to a predetermined representation, referred to here as an observation of the RL policy or model. The RL policy or model may map the observations to actions where the action space may be the available power settings for each connector between a charge point and EV. Thus, given an observation, the RL model may determine an optimal power delivery/charging strategy for plugged-in EVs. The output of the optimizer may be communicated to each charge point and their setpoints may be updated accordingly.

Figure 7A:
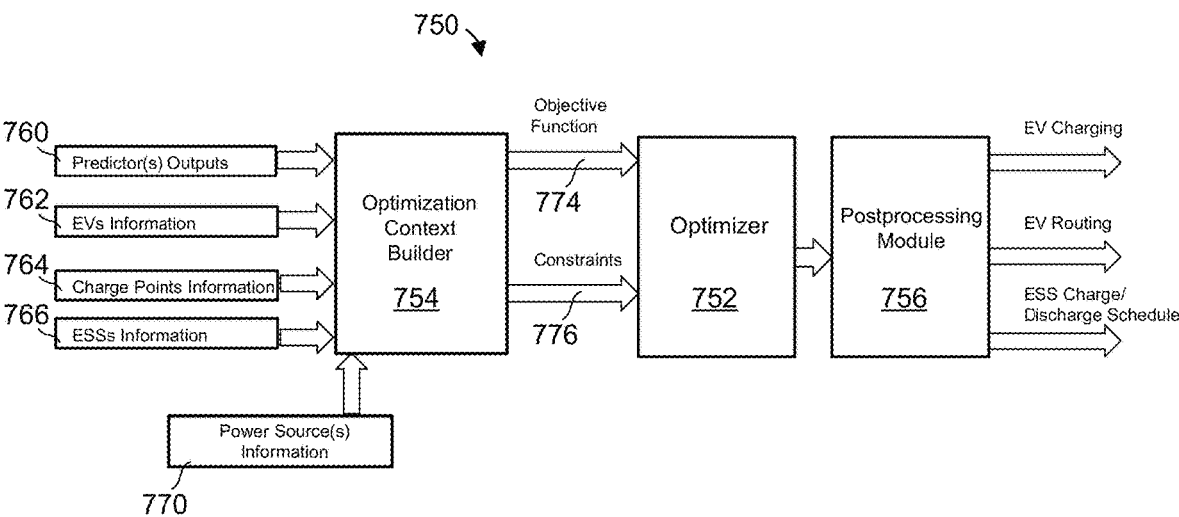
FIG. 7A is a block diagram of an example optimization engine.

FIG. 7A is a block diagram of an example optimization engine 750, which in this embodiment may be an optimizer, or a part thereof, of an optimizer in EV management system 200, for example of an optimizer of EV management controller 210 or depot controller 206. Generally, optimization engine 750 determines optimal values for decision variables over an optimization horizon, meaning a future time period. In an embodiment, optimization engine 750 may be based on a mathematical optimization model and a solver (e.g. optimizer) to find an optimal values for decision variables. In other embodiments, the optimization may be based on other optimization approaches, including but not limited to machine learning techniques such as supervised learning, reinforcement learning, and unsupervised learning.

In an embodiment, optimization engine 750 may be a multi objective optimization engine, which optimizes based on two or more objectives.

Optimization engine 750 may comprise an optimizer 752, an optimization context builder 754, and a postprocessing module 756.

Optimization context builder 754 may collect, for example, one or more of output(s) of predictor(s) 760760, EV information 762 such as EV type, EV SoC, EV location, Charge point information 764, such as charge point status, charge point location, ESS information 766, such as ESS SoC or other energy level, power source information 770, such as energy availability, and so on.

Furthermore, more generally, optimization context builder 754 may collect any suitable historical information and/or live or current data or information. This may include one or more of information relating to EV information, charge point information, ESS information, power source information, weather information, traffic information, map our routing information, and so on.

Outputs of one or more predictors 760 may be output from any suitable predictor(s), including any predictors according to the present disclosure. For example, predicted information may include one or more of predicted power grid power availability information, predicted electricity market price information, predicted weather information, predicted traffic information, predicted customer demand information, predicted EV SoC information, and so on. This all applies generally to any predictors according to the present disclosure.

Optimization context builder 754 may use a configuration object such as file or database table to collect the information.

Optimization context builder 754 may build a mathematical optimization model for an optimizer of the EV management system 200. A mathematical optimization model may include an objective function 774 and a set of constraints 776. The mathematical optimization model may be any suitable model(s) or algorithm(s) such as a linear optimization model, quadratic optimization model, mixed integer linear optimization model, nonlinear optimization model, or any other suitable models or algorithms.

The optimization objective function 774 may define a mapping between decision variables and one or more objectives of the system over an optimization horizon. Some example objectives have already been described.

The optimization constraints 776 may comprise equality and/or inequality constraints relating the decision variables or other parameters of an optimization model. Constraints may be of any suitable type or value.

Optimizer 752 may receive objective function 774 and constraints 776, and possibly other information, and may then determine optimal values for decision variables over an optimization horizon. Optimizer 752 generally comprises an optimization algorithm(s). An optimization algorithm may include any suitable type(s) of optimization algorithm, including but surely not limited to a simplex algorithm, branch and bound algorithm, gradient descent algorithm, and genetic algorithm. Furthermore, optimizer 752 may be an off-the-shelf optimization solver library, a solver developed specifically for the mathematical optimization model, or some combination.

Accordingly, optimizer 752 may use any suitable input information to determine optimal values for decision variables over an optimization horizon. Decision variables may include any suitable decision variables. For example, in an embodiment, the decision variables may comprise one or more of an EV charging variable, an EV routing variable, an energy storage system (ESS) charge-discharge variable, and so on.

Postprocessing module 756 may then perform or trigger operations based on the determined optimal values for decision variables over the optimization horizon.

Optimal values may be determined for a first time period, for example for a future 24-hour period, while an optimization horizon may be for a second time period, for example for a future 7 day period containing the 24 hour period.

In an embodiment, output(s) of postprocessing module 756 may be modified, for example by a human operator, for example to correct any issues, before postprocessing module 756 performs the operations. Modifications may be performed via a user interface of a computing device of EV management system 200 or of a computing device that is in communication with system 200.

Optimization engine 750 may repeat the optimization at any suitable intervals, including at fixed intervals or in response to some triggering action.

Figure 7B:
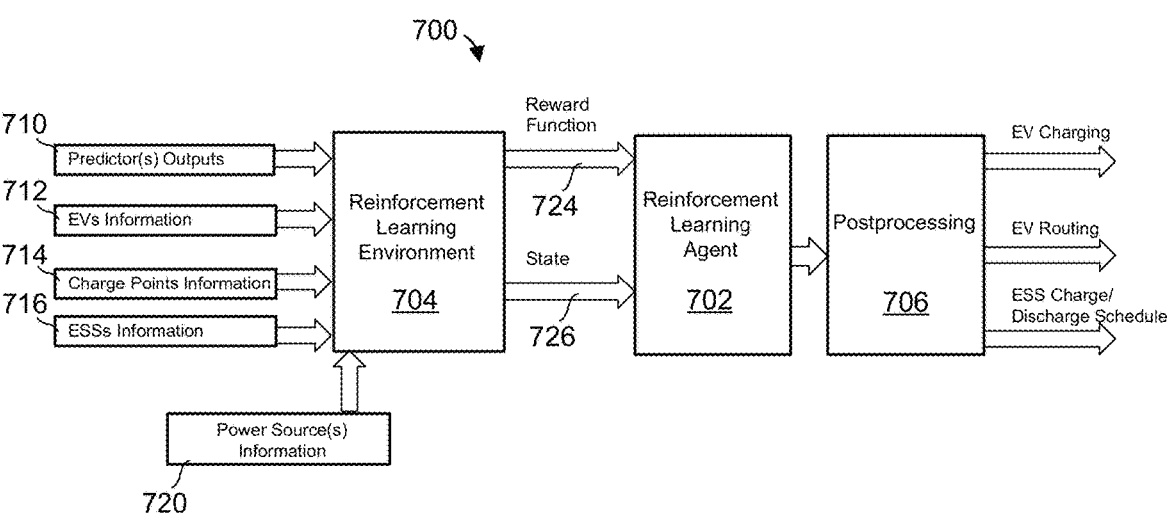
FIG. 7B is a block diagram of another example optimization engine.

FIG. 7B is a block diagram of another example optimization engine 700. In comparison to the embodiment of FIG. 7A, in this example embodiment, optimization engine 700 is based on a reinforcement learning model and a reinforcement learning agent 702 to find the optimal values for decision variables. For simplicity, the description of aspects of engine 700 of FIG. 7B that may be similar to aspects of engine 750 of FIG. 7A are not repeated.

Optimization engine 700 may comprise an optimizer 702, in the form a reinforcement learning agent, a reinforcement learning environment 704, and a postprocessing module 706.

Reinforcement learning environment 704 may comprise some or all of the information 710, 712, 714, 716, 720, similar to the information collected by optimization context builder 504 in the embodiment of FIG. 5.

A reinforcement learning model may include a reward function 724 and state information 726. The reinforcement learning model may be any suitable model(s) or algorithm(s). Non-limiting examples of reinforcement learning algorithms or techniques include but are not limited to Q-learning, state-action-reward-state-action (SARSA), deep Q-networks (DQNs), deep deterministic policy gradient (DDPG), actor-critic, and so on.

Reinforcement learning agent 702 may receive reward function 724 and state 726, and may then determine optimal values for decision variables over an optimization horizon.

Again referring to FIG. 2, some example communication connections between computer hardware components of the system 200 as well as devices outside of system 200 are described.

In general, information may include any type(s) of information, including statuses, signals, data, metadata, requests for information, and so on. Connections may be wired or wireless (for example universal serial bus (USB) or Wi-Fi, respectively), short-range or long-range (for example Bluetooth or via a cellular network, respectively), depending on how close devices are to each other and for how long. The EV management system 200 is generally impartial to the connection media or communication protocols used.

Any hardware devices 220a onboard EVs 220 may communicate with the EVs themselves via wired and/or wireless (e.g., Bluetooth) connections. Under normal operation, any connected hardware devices 220a onboard EVs and/or the EVs themselves may be connected to the internet via one or more cellular networks or other communication services or links.

When in sufficient proximity, any connected hardware devices 220a onboard EVs 220 and/or the EVs themselves may have a wireless (e.g., Bluetooth) connection with pieces of computer hardware, including other such devices or EVs.

Additionally or alternatively, when in sufficient proximity to be connected to a network or other connection at a depot 202, including a wireless network or connection, for example a local area network (LAN), an EV 220 may communicate information with the LAN, and thus possibly with a charge point or other EVs via the LAN without needing to be plugged in.

When plugged into a charge point 208, an EV 220 has a wired connection with the charge point through which power and/or information may be transferred between the charge point and the EV. An EV and a charge point may communicate via a specific communication protocol. A charge point and an ESS may have one or more wired and/or wireless connections with one or more networks or other connections, for example LANs, such as those of the depots at which they are located, which in turn may be connected to the internet. Examples of wired and wireless connections are Ethernet and Wi-Fi, respectively. Additionally or alternatively, a charge point 208 and an ESS 211 may have wireless (e.g., Bluetooth) connections with computer hardware, including other pieces of a charge point or ESS, when they are in sufficient proximity for a wireless connection.

The depot controller hardware 206a may have wired and/or wireless connections with a network such as a LAN, for example a LAN or network of the depot. In some embodiments, the depot controller hardware 206a is an optional component. The charge point(s), any ESSs, and depot controller hardware 206a of a depot may be connected to a LAN or other network, and thus they may be able to communicate with each other, as well as with plugged-in EVs, and any EVs that are connect to a wireless network at the depot.

EV management controller hardware 210a may have one or more connections to the internet such as via their own LAN, or in the case of multiple cloud computing sites, multiple LANs. EV management controller hardware 210a and depot controller hardware 206a may be in communication, for example over the internet or other connection, and thus they may be able to communicate with plugged-in EVs, any EVs wirelessly connected to the depot, and any EVs connected to a cellular or other network.

FIGS. 8 to 12 are screenshots of an example system operator dashboard or other user interface of an EV management system according to the present disclosure, which displays and visualizes some information. In this example, the system uses RL to avoid exceeding a grid connection limit of an EV depot(s), while ensuring that EVs are charged to their target SoCs (by charge points). The system may comprise one depot or multiple depots.

Figure 8:
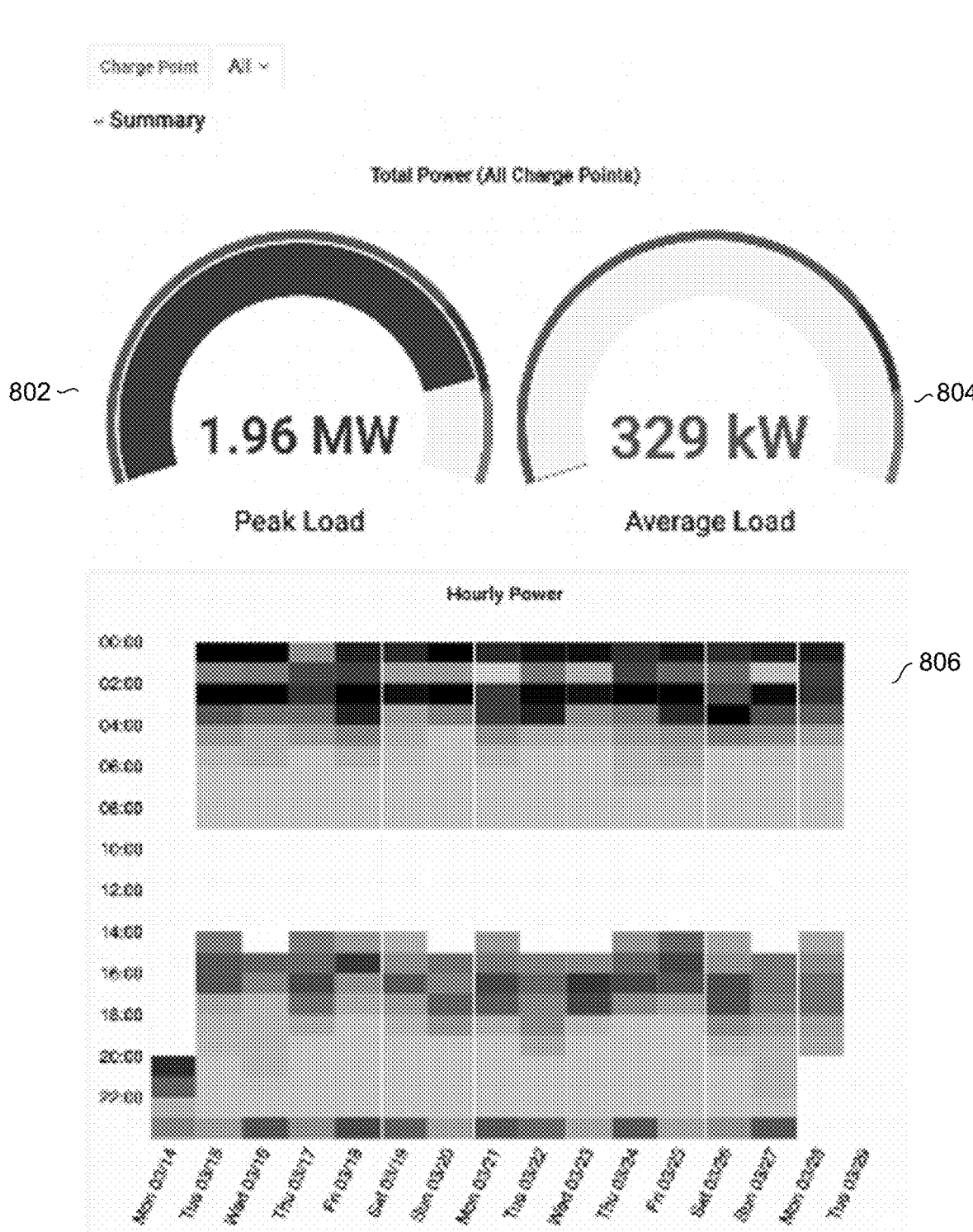
FIG. 8 is a screenshot of an example dashboard showing the total power consumed by charge points in a system.

FIG. 8 shows the total power consumed by all charge points in the system, namely a peak load 802, and an average load 804, at a specific time. The screenshot also shows a heatmap 806 of the hourly total power consumed by all charge points. The heatmap 806 is made up of multiple rectangular blocks, each with a level of coloring or shading, which indicates the relative amount of total power that was consumed by all charge points during a one hour time period.

Figure 9:
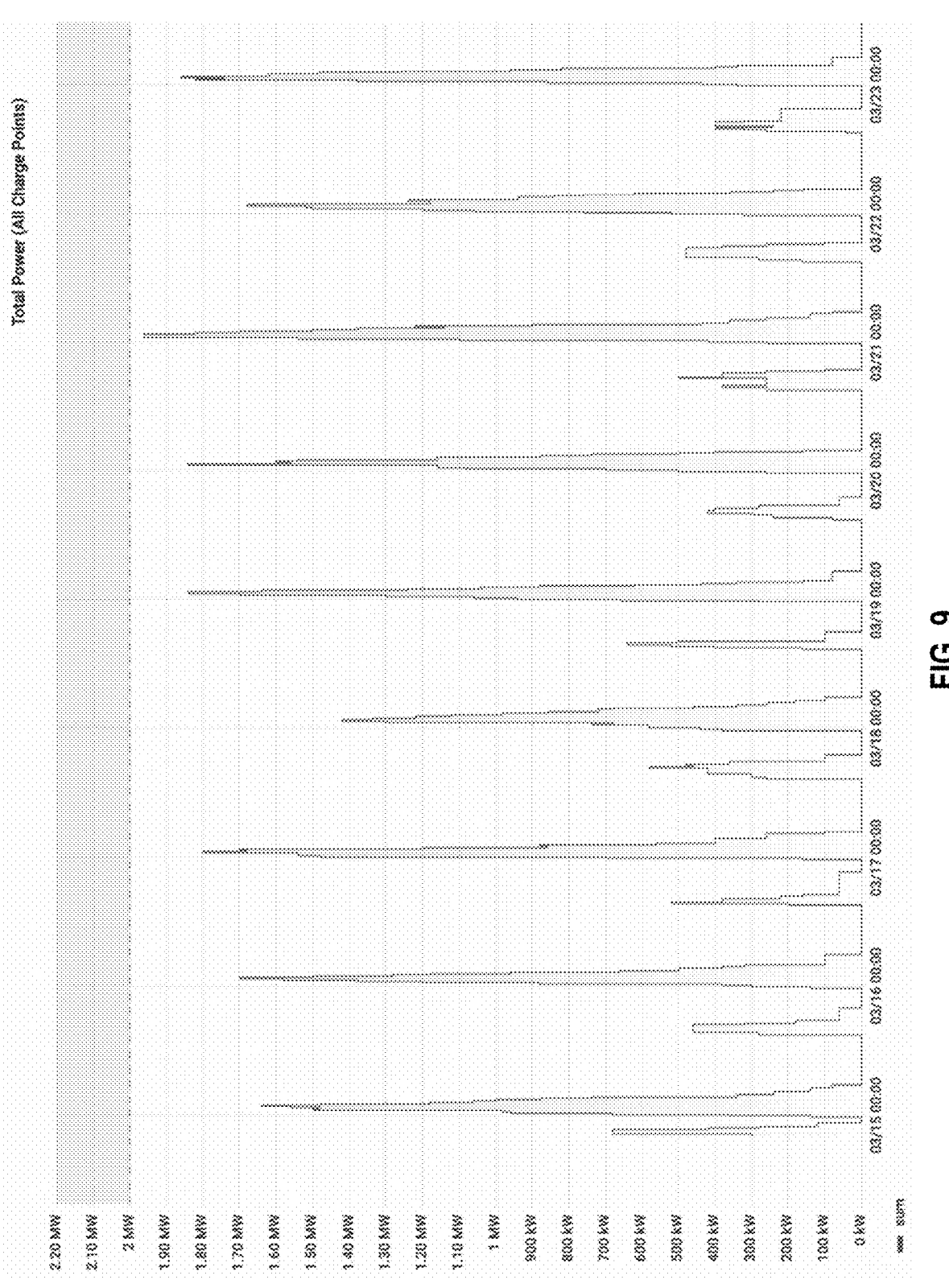
FIG. 9 is a screenshot of an example dashboard showing a time series plot of the total power consumed by charge points over a 9-day period.

FIG. 9 represents a time series plot of the total power consumed by all charge points over a 9-day period, showing that no peak in power consumption exceeds a 2-MW grid connection limit. Thus, power is consumed to charge EVs but a grid power connection limit is respected.

Figure 10:
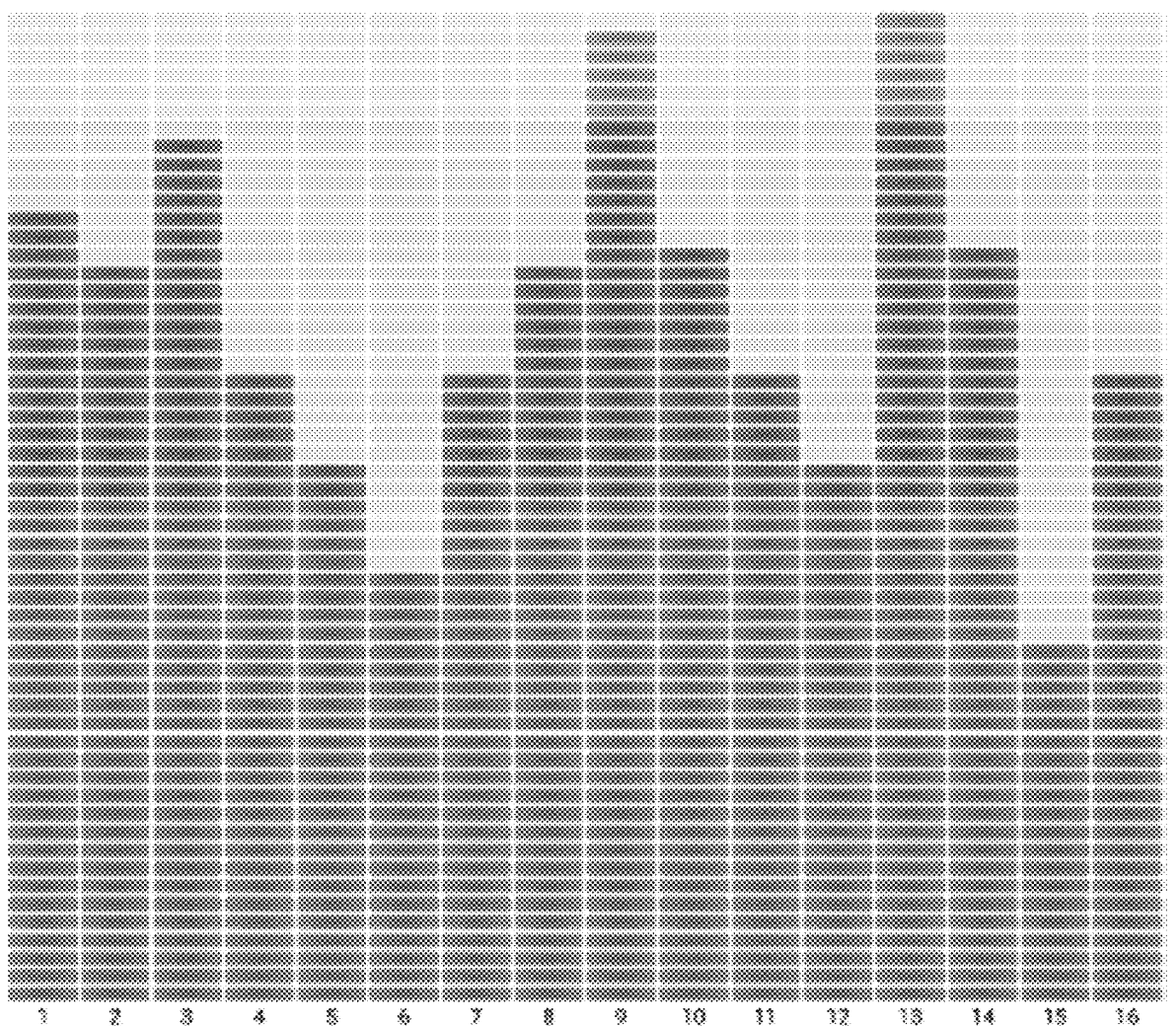
FIG. 10 is a screenshot of an example dashboard showing peak power consumed by individual charge points.

FIG. 10 represents the peak power consumed by individual charge points, here showing charge points 1 through 16. The peak power consumed may be the peak power during a defined time period, such as one hour, a day, a week, and so on.

Figures 11, 12:
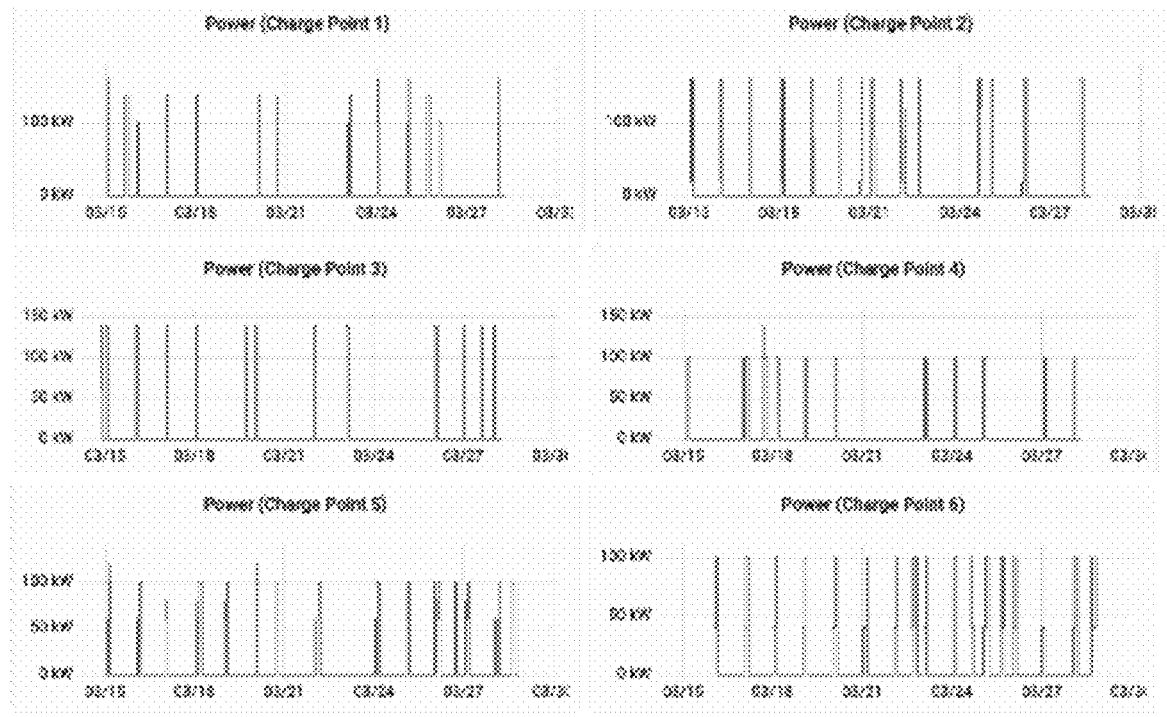
FIG. 11 is a screenshot of an example dashboard showing time series plots of the power consumed at individual charge points.
FIG. 12 represents a table containing raw data.

FIG. 11 represents time series plots of the power consumed at individual charge points over a multiple day period, here showing charge points 1 through 6.

FIG. 12 represents a table containing raw data for each session of time for which a bus is at the depot: bus ID, charge point and connector IDs, battery capacity in kWh, SoC upon arrival at the depot, arrival time at the depot, preferred time of departure from the depot (by which time the bus should be charged to its preferred departure SoC), current estimated SoC, and preferred departure SoC. Also included in the table is some metadata.

Some failure handling mechanisms are now described. In some embodiments, the EV management system may have failure handling mechanisms for addressing full or partial outages, for example of internal or external outages of connectivity, power, or functionality. The mechanism may enable the system to maintain or recover its operation to the best of its ability.

The above description of embodiment according to the present disclosure are generally based on normal operating conditions, meaning without any consideration given to a failure relating to the system. For example, if a cellular network or other communication service is used, the possibility of a cellular network or internet outage was not addressed. Similarly, if a power grid is used, such as by a depot or dedicated cloud computing site, the possibility of a power outage was not addressed. Furthermore, a possibility of a failure in the physical or computer hardware components of the system was not addressed. However, in reality, outages and failures do occur from time to time.

In the case of a partial power outage, a depot operator or a pre-configured system may notify a compute module to disable affected assets such as charge points, any ESSs, and so on. This may allow for an optimizer of the system to, for example, reconfigure and to produce outputs that are solely for unaffected controllable assets in the system.

Some example and non-limiting failure handling mechanisms for addressing different failures include are now described.

In a case where there is an internet or other connectivity outage, for example between an EV depot and an EV management controller, or if there is a power or other failure at a cloud computing site, one or more of these components may report the event to one or more other components. For example, the portion of the EV management system running on a depot's local computing hardware may (using reserve power) report a power outage to the portion running in the cloud, for appropriate response. Furthermore, a battery backup, which may include an ESS functioning as a battery backup, may be used to partially or fully restore power, at least temporarily, for example to a depot controller 206, an EV management controller 210, or to any other suitable component. Depot controller 206 may take over some or all tasks, or simplified alternatives thereof, of EV management controller 210. If such tasks do not include training machine learning models, as may be the case, then training may be done only semi-automatically, or retraining may be deferred and existing trained models used in the meantime.

If there is a power or other failure at a depot 202, another depot(s) and its components may be used partially or fully as backups, at least temporarily.

If there is a loss of connectivity with any EVs, such as due to a cellular network or other communication service outage, EVs may exchange information with other parts of the system via another wireless connection, such as via Wi-Fi or Bluetooth, with depots or other EVs within sufficient proximity.

EVs may even form a slow kind of mesh network in passing within close proximity and exchanging information with each other.

In general, if a physical or hardware computing component or subcomponent of the system fails, another suitably similar (sub) component may be used in its place, which may be suitably accounted for by any optimizations or other computational tasks to which it is relevant.

Furthermore, the failure mechanisms do not have to be used exclusively under failure conditions. Rather, they may be used for testing or any desirable purpose.

Figure 13:
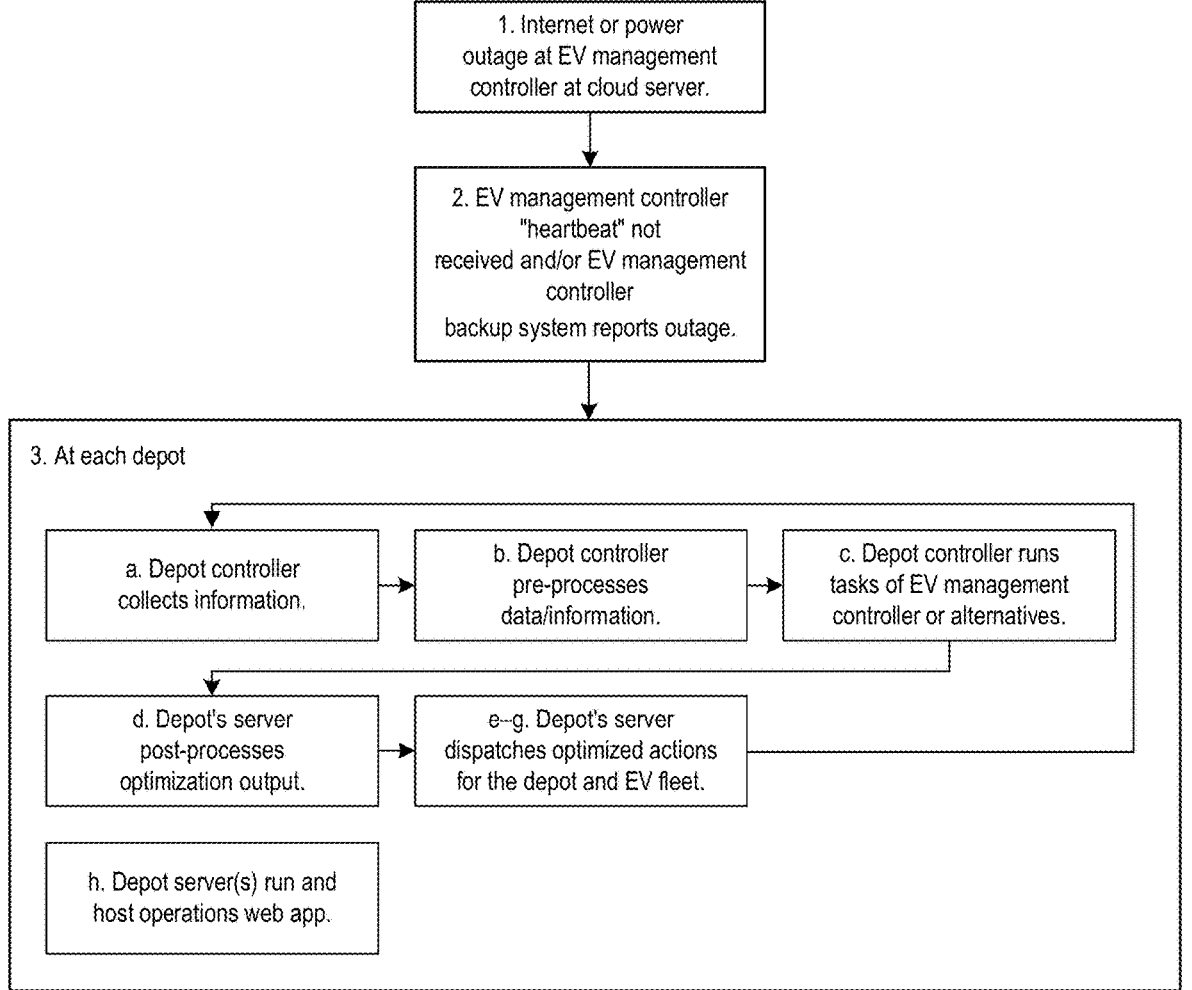
FIG. 13 is an example sequence flow diagram of handling of an internet or power outage at a cloud server in an implementation of a system.

FIG. 13 is an example sequence flow diagram of handling of an internet or power outage at a cloud server in an implementation of the system that optimizes for one or more objectives. The actions or steps shown, and their order, are examples only. In this example, the cloud server is the only cloud computing hardware in the system. The cloud computing hardware may be used to partly or fully implement an EV management controller. In another embodiment where EV management controller is not implemented at a cloud server, the same or similar sequence flow may still be implemented.

At block 1, there is an internet connectivity outage, or power outage without backup, localized to the cloud server (or its cloud computing site) implementing the EV management controller.

At block 2, a depot controller learns of the outage. For example, the depot controller may not receive a heartbeat signal from the EV management controller (at cloud server). Alternatively or additionally, a backup system of the EV management controller may report the outage to the depot and any other components of the system, for example via cellular network or other communications service in the case of an internet connectivity or other communications system outage.

At block 3, actions or steps at one or more depots are shown.

At block 3a, a depot controller continues to collect information about the state of the depot and the EVs to use in the optimization.

At block 3b, the depot controller may continue to pre-process data/information received from charge point(s) and on-site EVs as if preparing to send it to EV management controller at the cloud server, but the depot controller does not send the information to the EV management controller.

At block 3c, the depot controller may run tasks of the EV management controller pertaining to the depot, or run simplified alternatives thereof. Example tasks include forecasting, linear programming optimization instead of RL-based optimization, and so on. Online training of the RL model may not be performed.

At block 3d, the depot controller may post-process output of its optimization. In an embodiment, the post-processing may be similar to before, but slightly differently because the software module for the linear programming optimization happens to present its output differently to that for the RL-based optimization.

At block 3e-g, the depot controller may dispatch actions to controllable assets in the system. For example, actions may include directions to each EV for what route each EV outside the depot should take and what charge point each EV inside the depot should park at and plug into. In addition, the depot controller may dispatch a charging command to a charge point of the depot, for example via a CPMS. The depot controller may convert its optimization output to a standard format of a charging command expected by the CPMS running on the same server. The charge point may perform the dispatched charging actions. EVs plugged into the charge points may be charged according to the optimization that was performed. The depot controller at each of one or more depots may dispatch commands for power flow to an ESS. Power may flow into or out of the ESS according to the optimization that was performed.

At block 3h, the depot controller at each of one or more depots may take over the running and hosting of a web app of the system, for example an app used by the system operators.

In general, systems and methods according to the present disclosure for optimal EV fleet control may enable vehicle fleets and their operators to transition to EVs while reducing their energy costs, reducing greenhouse gas emissions, and continuing to provide reliable service. The system is unified and flexible. The system may be deeply integrated with new and existing components and the expectations of system operators and users. The system may incorporate failure handling strategies for robustness. Such intelligent management of renewable, sustainable, or low- or zero-emissions assets may realistically play a key role in the global endeavor to minimize net $CO_2$ emissions to zero.

In an embodiment, an EV management system is modular in a manner that enables control or optimization to be performed for a subset of the connected equipment and subsystems. In an embodiment, the control software incorporated in the system is hosted in the cloud. In an embodiment, portions of the control software may be hosted locally at a facility supporting the EV fleet such as a depot. In an embodiment, an EV management system is integrated with external software programs that control elements of the operations of an EV fleet for the purposes of importing data, sending data, or executing control signals (e.g., scheduling systems). In an embodiment, an EV management system is configured to optimize energy supply or consumption according to one or more objectives. In an embodiment, an EV management system comprises control software which implements machine learning techniques. In an embodiment, the machine learning techniques may adapt to a subset of elements (systems, equipment, objectives) pertaining to a given application. The software may adapt to the set of available control parameters for optimization depending on the subset of elements available.

In an embodiment, the connected equipment includes behind-the-meter energy storage systems (ESSs) that may be charged or discharged under the control of the software platform. In an embodiment, the connected equipment includes behind-the-meter energy generation systems that may operate passively (for example rooftop solar) or be operated under the control of the software platform. In an embodiment, the connected equipment includes loads that share sources of energy with the charge point(s) serving the fleet. In an embodiment, the flexibility of the system, for example in terms of modular components for information collection and computation for the control of physical system components, may allow any combination of optimizations to be performed together such that an overall optimized result may be achieved without manual management. In an embodiment, the integrated and automated nature of the EV management system, for example in terms of controllable, physical system components being connected to the rest of the system running software for their automated control, may facilitate the collection, preprocessing, and input of required information to the forecasting and subsequent optimization(s) run by the system, as well as the carrying out of the resulting optimal actions decided on by the optimizations.

In an embodiment, the coordinated nature of the EV management system, for example in terms of facilitating multiple optimizations of possibly conflicting objectives to be performed together such that an overall optimal result may be achieved, may allow an entire fleet across multiple depots to be optimized such that a collective objective is achieved. In an embodiment, the EV management system has failure handling mechanisms such that in the event of outages of internal or external connectivity, power, or functionality in general, the system maintains or recovers its operation to the best of its ability.

FIG. 14 is a process flow diagram of an example method. The example method may be performed at or by one or more electronic devices each having one or more computer processors and computer-readable memory. The method may provide control in relation to charging of a plurality of electric vehicles (EVs).

At block 1400, the process involves generating charging control information for providing charging control in relation to the EVs, wherein the generating comprises performing a receding horizon optimization for an optimization horizon having a plurality of time intervals. The optimization may be based on EV charging goal information related to the EVs including information relating to target charging completion time, and target EV battery state of charge (SoC) information at target charging completion. In addition, the optimization may be based on prediction information relating to EVs predicted to become available for charging during time slots in the optimization horizon. The charging control information may comprise EV charging schedule information comprising an indication of individual EVs to charge during a given time interval.

At block 1402, the process may involve transmitting the charging control information to computing devices associated with respective EVs for use in controlling charging of the EVs.

In some embodiments, algorithms, techniques, and/or approaches according to the present disclosure may be performed or based on artificial intelligence (AI) algorithms, techniques, and/or approaches. This includes but is not limited to predictors and/or optimizers according to the present disclosure, as well as controlling of controllable assets, for example an EV fleets, EVs, EV charging architecture, ESSs, and so on.

In some embodiments, the AI algorithms and techniques may include machine learning techniques.

Machine Learning (ML) may be used in one or more aspects of an EV management system according to the present disclosure. Machine learning systems may be used to predict information about or associated with one or more controllable assets, for example energy prices (e.g. from a power grid, renewable sources, etc.), weather information, traffic information, power availability (e.g. from a grid or renewable sources), customer demand, electricity demand, and so on. Machine learning models may be used, as a mere example, to predict future resource availability and demand requirements, and/or control assets in a system, for instance using one or more optimizations. Predictors may be used to control or schedule, for example, whether, how and/or when EVs are charged, EV routes, assignment of EVs to specific regions and/or routes, and so on. Further, predictors and/or optimizers, and the training thereof, may also use or be based on machine learning techniques.

A machine learning algorithm or system may receive data, for example historical data, streaming controllable asset data, environmental data, and/or third party data, and, using one or more suitable machine learning algorithms, may generate one or more datasets. Example types of machine learning algorithms include but are not limited to supervised learning algorithms, unsupervised learning algorithms, reinforcement learning algorithms, semi-supervised learning algorithms (e.g. where both labeled and unlabeled data is used), regression algorithms (for example logistic regression, linear regression, and so forth), regularization algorithms (for example least-angle regression, ridge regression, and so forth), artificial neural network algorithms, instance based algorithms (for example locally weighted learning, learning vector quantization, and so forth), Bayesian algorithms, decision tree algorithms, clustering algorithms, and so forth. Further, other machine learning algorithms may be used additionally or alternatively. In some embodiments, a machine learning algorithm or system may analyze data to identify patterns and/or sequences of activity, and so forth, to generate one or more datasets.

An EV management system may comprise one or more control policies. The control policies of the system may be based on trained machine learning based systems. In this sense, a control policy may be part of a controller or control agent. A control agent observes its environment, which may be referred to as a control environment, and takes action based on its observations, or percepts, of the control environment. The taking of action is referred to as controlling the system. Depending on the state of the environment, taking action may involve taking no action at all with respect to the system outputs, for example if there has been little or no change in the state since the last time the agent took action. Thus, doing nothing (not updating any setpoints, etc.) is a valid action in a set of actions in the action space of the controller. In an embodiment, the present systems and methods may exploit the flexibility of controllable assets in the system to achieve improved performance of the system. For example, the flexibility of controllable assets may be exploited in response to changes in the control environment.

In an embodiment, online machine learning may be employed. Online machine learning is a technique of machine learning where data becomes available sequentially over time. The data is utilized to update a predictor for future data at each step in time (e.g. time slot). This approach of online machine learning may be contrasted to approaches that use batch learning wherein learning performed on an entire or subset of training data set. Online machine learning is sometimes useful where the data varies significantly over time, such as in power or energy pricing, commodity pricing, and stock markets. Further, online machine learning may be helpful when it is not practical or possible to train the agent over the entirety or a subset of a data set.

In embodiments according to the present disclosure, training of a machine learning system, such as a predictor or optimizer, may be based on offline learning and/or online learning where streaming real-time data may be combined with at least some data, for example from a database to train the machine learning system in real-time or near real-time. Over time, a machine learning system may be retrained, for example with newer or different training data.

The concept of explainable AI is gaining increasing popularity in AI software systems, such as those using ML or RL techniques, and particularly where the AI model is a "black box" such as whose inner workings are difficult to understand or explain, especially to a layperson. This may apply to at least some of the methods and systems according to the present disclosure that employ AI techniques such as ML, for example as an ML- or RL-based optimizer. That being said, the concept of explainable AI may be generalized to being able to explain software systems' actions to those affected by them (e.g., users of the system), whether the action is based on AI or not. For example, if the system is being used for multi-objective optimization wherein different, conflicting sub-objectives culminate into one, overall objective to which the optimization is applied, then the numerical weightings with which the sub-objectives may be combined can help explain the optimizer's action according to those weightings. This may notably include soft constraints which are factored into the overall objective as sub-objectives. For example, if a vehicle depot operator assigned a high weighting to minimizing GHG emissions and a low weighting to minimizing energy cost (thereby prioritizing the former objective over the latter), and the current availability of renewable energy is low, then operators and other system users being made readily aware of such facts would aid in the overall understanding, trust, and adoption of such systems.

Figure 15:
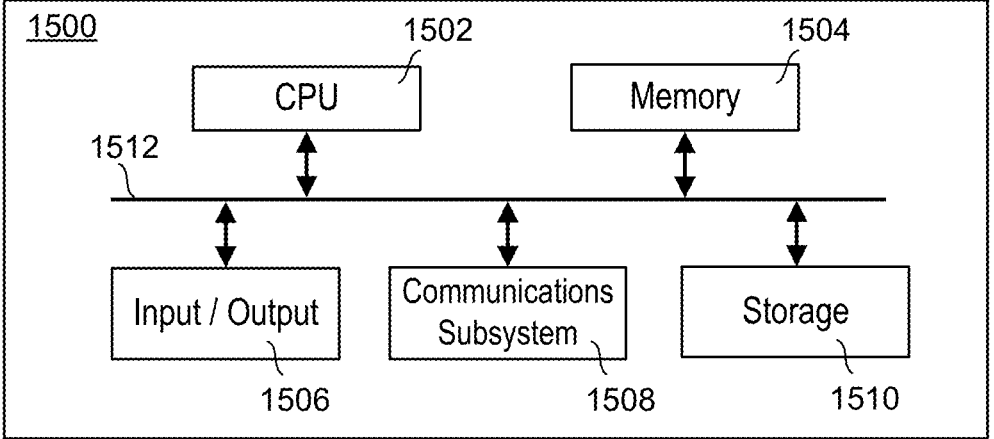
FIG. 15 is a block diagram of an example computerized device or system that may be used in implementing one or more aspects or components of an embodiment according to the present disclosure.

FIG. 15 is a block diagram of an example computerized device or system 1500 that may be used in implementing one or more aspects or components of an embodiment according to the present disclosure. For example, system 1500 may be used to implement a computing device or system, such as an EV management system, an optimizer, a predictor, a depot controller, and so on, to be used with a device, system or method according to the present disclosure. Thus, one or more systems 1500 may be configured to implement one or more portions of the systems or apparatuses or methods according to the present disclosure.

Computerized system 1500 may comprise one or more of classic, analog, electronic, digital, and quantum computing technologies. Computerized system 1500 may include one or more of a computer processor device 1502, memory 1504, a mass storage device 1510, an input/output (I/O) interface 1506, and a communications subsystem 1508. A computer processor device may be any suitable device(s), and encompasses various devices, systems, and apparatus for processing data and instructions. These include, as examples only, one or more of a hardware processor, a digital processor, an electronic processor, a quantum processor, a programmable processor, a computer, a system on a chip, and special purpose logic circuitry such as an ASIC (application-specific integrated circuit) and/or FPGA (field programmable gate array). In addition, system 1500 may include hardware dedicated to one or more specific purposes, such as a graphics processing unit (GPU), or a tensor processing unit (TPU) or other artificial intelligence accelerator ASIC, for example for machine learning (ML).

Memory 1504 may be configured to store computer readable instructions, that when executed by processor 1502, cause the performance of operations, including operations in accordance with the present disclosure.

One or more of the components or subsystems of computerized system 1500 may be interconnected by way of one or more buses 1512 or in any other suitable manner.

The bus 1512 may be one or more of any type of several bus architectures including a memory bus, storage bus, memory controller bus, peripheral bus, or the like. The processor 1502 may comprise any type of electronic data processor. The memory 1504 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1510 may comprise any type of storage device configured to store data, programs, and other information and to make the data, programs, and other information accessible via the bus 1512. The storage device may be adapted to store one or more databases and/or data repositories, each of which is generally an organized collection of data or other information stored and accessed electronically via a computer. The term database or repository may thus refer to a storage device comprising a database. The mass storage device 1510 may comprise one or more of a solid state drive, hard disk drive, a magnetic disk drive, an optical disk drive, or the like. In some embodiments, data, programs, or other information may be stored remotely, for example in the cloud. Computerized system 1500 may send or receive information to the remote storage in any suitable way, including via communications subsystem 1508 over a network or other data communication medium.

The I/O interface 1506 may provide interfaces for enabling wired and/or wireless communications between computerized system 1500 and one or more other devices or systems, such as an EV management system according to the present disclosure. Furthermore, additional or fewer interfaces may be utilized. For example, one or more serial interfaces such as Universal Serial Bus (USB) (not shown) may be provided. Further, system 1500 may comprise or be communicatively connectable to a display device, and/or speaker device, a microphone device, an input device such as a keyboard, button, pointer, mouse, touch screen display, microphone, camera, scanner, or any other type of input device.

Computerized system 1500 may be used to configure, operate, control, monitor, sense, and/or adjust devices, systems, and/or methods according to the present disclosure.

A communications subsystem 1508 may be provided for one or both of transmitting and receiving signals over any form or medium of digital data communication, including a communication network. Examples of communication networks include a local area network (LAN), a wide area network (WAN), telecommunications network, cellular network, an inter-network such as the Internet, and peer-to-peer networks such as ad hoc peer-to-peer networks. Communications subsystem 1508 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1374), Thunderbolt™, WiFi™ (e.g. IEEE 802.11), WiMAX (e.g. IEEE 802.16), Bluetooth™, or Near-field communications (NFC), as well as General Packet Radio Service (GPRS), Universal Mobile Telecommunications System (UMTS), Long-Term Evolution (LTE), LTE-A, 5G NR (New Radio), satellite communication protocols, and dedicated short range communication (DSRC). Communication subsystem 1508 may include one or more ports or other components (not shown) for one or more wired connections. Additionally or alternatively, communication subsystem 1508 may include one or more transmitters, receivers, and/or antenna elements (none of which are shown). Further, system 1500 may comprise clients and servers.

Computerized system 1500 of FIG. 15 is merely an example and is not meant to be limiting. Various embodiments may utilize some or all of the components shown or described. Some embodiments may use other components not shown or described but known to persons skilled in the art.

Logical operations of the various embodiments according to the present disclosure may be implemented as (i) a sequence of computer implemented steps, procedures, or operations running on a programmable circuit in a computer, (ii) a sequence of computer implemented operations, procedures, or steps running on a specific-use programmable circuit; and/or (iii) interconnected machine modules or program engines within the programmable circuits. The computerized device or system 1500 of FIG. 15 may practice all or part of the recited methods or operations, may be a part of systems according to the present disclosure, and/or may operate according to instructions in computer-readable storage media. Such logical operations may be implemented as modules configured to control a computer processor, such as processor 1502, to perform particular functions according to the programming of the module. In other words, a computer processor, such as processor 1502, may execute the instructions, steps, or operations according to the present disclosure, including of the one or more of the blocks or modules. For example, one or more of the modules or blocks in FIGS. 1-7 may be configured to control processor 1502. For example, the modules or blocks in FIGS. 1-7 may include but are not limited to, for example, EV management system 100, 200, an optimizer, predictors, and so on. At least some of these blocks or modules may be stored on storage device 1510 and loaded into memory 1504 at runtime or may be stored in other computer-readable memory locations.

The concepts of real-time and near real-time may be defined as providing a response or output within a predetermined time interval, usually a relatively short time. A time interval for real-time is generally shorter than an interval for near real-time. Mere non-limiting examples of predetermined time intervals may include the following as well as values below, between, and/or above these figures: 10 s, 60 s, 5 min, 10 min, 20 min, 30 min, 60 min, 2 hr, 4 hr, 6 hr, 8 hr, 10 hr, 12 hr, 1 day.

The term module used herein may refer to a software module, a hardware module, or a module comprising both software and hardware. Generally, software includes computer executable instructions, and possibly also data, and hardware refers to physical computer hardware.

The term 'data' generally refers to raw or unorganized facts whereas 'information' generally refers to processed or organized data. However, the terms are generally used synonymously herein unless indicated otherwise.

Embodiments and operations according to the present disclosure may be implemented in digital electronic circuitry, and/or in computer software, firmware, and/or hardware, including structures according to this disclosure and their structural equivalents. Embodiments and operations according to the present disclosure may be implemented as one or more computer programs, for example one or more modules of computer program instructions, stored on or in computer storage media for execution by, or to control the operation of, one or more computer processing devices such as a processor. Operations according to the present disclosure may be implemented as operations performed by one or more processing devices on data stored on one or more computer-readable storage devices or media, and/or received from other sources.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and/or alternatives of embodiments described and/or shown herein, including one or more aspects thereof, are intended to apply generally to all of the teachings of the present disclosure, including to all of the embodiments described and illustrated herein, insofar as they are compatible. Thus, the present disclosure includes embodiments having any combination or permutation of features of embodiments or aspects herein described.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The embodiments according to the present disclosure are intended to be examples only. Alterations, modifications and variations may be effected to the particular embodiments by those of skill in the art without departing from the scope, which is defined solely by the claims appended hereto.

The terms "a" or "an" are generally used to mean one or more than one. Furthermore, the term "or" is used in a non-exclusive manner, meaning that "A or B" includes "A but not B," "B but not A," and "both A and B" unless otherwise indicated. In addition, the terms "first," "second," and "third," and so on, are used only as labels for descriptive purposes, and are not intended to impose numerical requirements or any specific ordering on their objects.

The invention claimed is:

1. A system, comprising:
a computer-readable storage medium having executable instructions; and
one or more computer processors configured to execute the instructions to provide control in relation to charging of a plurality of electric vehicles (EVs), the instructions to:
generate charging control information for providing charging control in relation to the EVs, wherein the charging control information relates to a horizon having a plurality of time intervals, the generating based on:
EV charging goal information related to the EVs including information relating to target charging completion time, and target EV battery state of charge (SoC) information at target charging completion, and prediction information relating to EVs predicted to become available for charging during time slots in the horizon, the prediction information comprising information representing predicted target EV battery SoC information for each of at least some of the EVs predicted to become available,
the charging control information comprising EV charging schedule information comprising an indication of individual EVs to charge during a given time interval; and
transmit the charging control information to computing devices associated with respective EVs for use in controlling charging of the EVs.

2. The system of claim 1, wherein the EV charging schedule information further comprises information relating to respective charging rates to be used with each of the individual EVs.

3. The system of claim 1, wherein the EV charging goal information comprises information relating to EVs that are currently charging.

4. The system of claim 1, wherein the EV charging goal information comprises prediction information comprising information representing predicted target charging completion time and predicted target EV battery state of charge (SoC) information at target charging completion.

5. The system of claim 1, wherein the prediction information relating to EVs predicted to become available for charging comprises information representing predicted target charging completion time for each of at least some of the EVs predicted to become available.

6. The system of claim 1, wherein the prediction information relating to EVs predicted to become available for charging comprises at least one of: a number of EVs predicted to become available for charging during at least one of the time slots, and predicted SoC information of EVs predicted to become available for charging.

7. The system of claim 1, the instructions further to:
generate operation control information for controlling operation of EVs, wherein the operation control information relates to a horizon having a plurality of time intervals, the generating based on control environment information comprising EV battery state of charge (SoC) information relating to the EVs; and
transmit the operation control information to computing devices associated with respective EVs for use in controlling the operation of the EVs.

8. The system of claim 7, wherein the operation control information comprises at least one of assignments of EVs to routes, and assignments of EVs to specific EVSEs for charging.

9. A method comprising:
at one or more electronic devices each having one or more processors and computer-readable memory to provide control in relation to charging of a plurality of electric vehicles (EVs):
generating charging control information for providing charging control in relation to the EVs, wherein the charging control information relates to a horizon having a plurality of time intervals, the generating based on:
EV charging goal information related to the EVs including information relating to target charging completion time, and target EV battery state of charge (SoC) information at target charging completion, and
prediction information relating to EVs predicted to become available for charging during time slots in the horizon, the prediction information comprising information representing predicted target EV battery SoC information for each of at least some of the EVs predicted to become available, the charging control information comprising EV charging schedule information comprising an indication of individual EVs to charge during a given time interval; and transmitting the charging control information to computing devices associated with respective EVs for use in controlling charging of the EVs.

10. The method of claim 9, wherein the EV charging schedule information further comprises information relating to respective charging rates to be used with each of the individual EVs.

11. The method of claim 9, wherein the EV charging goal information comprises information relating to EVs that are currently charging.

12. The method of claim 9, wherein the EV charging goal information comprises prediction information comprising information representing predicted target charging completion time and predicted target EV battery state of charge (SoC) information at target charging completion.

13. The method of claim 9, wherein the prediction information relating to EVs predicted to become available for charging comprises information representing predicted target charging completion time for each of at least some of the EVs predicted to become available.

14. The method of claim 9, wherein the prediction information relating to EVs predicted to become available for charging comprises at least one of: a number of EVs predicted to become available for charging during at least one of the time slots, and predicted SoC information of EVs predicted to become available for charging.

15. The method of claim 9, further comprising:

generating operation control information for controlling operation of EVs, wherein the operation control information relates to a horizon having a plurality of time intervals, the generating based on control environment information comprising EV battery state of charge (SoC) information relating to the EVs; and transmitting the operation control information to computing devices associated with respective EVs for use in controlling the operation of the EVs.

16. The method of claim 15, wherein the operation control information comprises at least one of assignments of EVs to routes, and assignments of EVs to specific EVSEs for charging.

17. A non-transitory computer-readable medium having computer-readable instructions stored thereon, the computer-readable instructions executable by at least one processor to cause the performance of operations relating to providing control in relation to charging of a plurality of electric vehicles (EVs), the operations comprising:

generating charging control information for providing charging control in relation to the EVs, wherein the charging control information relates to a horizon having a plurality of time intervals, the generating based on:

EV charging goal information related to the EVs including information relating to target charging completion time, and target EV battery state of charge (SoC) information at target charging completion, and prediction information relating to EVs predicted to become available for charging during time slots in the horizon, the prediction information comprising information representing predicted target EV battery SoC information for each of at least some of the EVs predicted to become available, the charging control information comprising EV charging schedule information comprising an indication of individual EVs to charge during a given time interval; and transmitting the charging control information to computing devices associated with respective EVs for use in controlling charging of the EVs.

18. The non-transitory computer-readable medium of claim 17, wherein the EV charging goal information comprises prediction information comprising information representing predicted target charging completion time and predicted target EV battery state of charge (SoC) information at target charging completion.

19. The non-transitory computer-readable medium of claim 17, wherein the prediction information relating to EVs predicted to become available for charging comprises at least one of: a number of EVs predicted to become available for charging during at least one of the time slots, and predicted SoC information of EVs predicted to become available for charging.

20. The non-transitory computer-readable medium of claim 17, the operations further comprising:

generating operation control information for controlling operation of EVs, wherein the operation control information relates to a horizon having a plurality of time intervals, the generating based on control environment information comprising EV battery state of charge (SoC) information relating to the EVs; and transmitting the operation control information to computing devices associated with respective EVs for use in controlling the operation of the EVs.

* * * * *